(12) United States Patent
Korotkikh et al.

(10) Patent No.: US 6,559,094 B1
(45) Date of Patent: May 6, 2003

(54) METHOD FOR PREPARATION OF CATALYTIC MATERIAL FOR SELECTIVE OXIDATION AND CATALYST MEMBERS THEREOF

(75) Inventors: Olga Korotkikh, Edison, NJ (US); Robert J. Farrauto, Edison, NJ (US); Andrew McFarland, Dunellen, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/392,813

(22) Filed: Sep. 9, 1999

(51) Int. Cl.[7] .................................... B01J 23/89
(52) U.S. Cl. ........................ 502/326; 502/327
(58) Field of Search ................... 502/326, 327

(56) References Cited

U.S. PATENT DOCUMENTS

| | | |
|---|---|---|
| 3,088,919 A | 5/1963 | Brown, Jr. et al. ......... 252/374 |
| 3,111,396 A | 11/1963 | Ball ........................... 25/156 |
| 3,216,782 A | 11/1965 | Cohn ........................... 23/2 |
| 3,216,783 A | 11/1965 | Cohn ........................... 23/2 |
| 3,540,878 A | 11/1970 | Levine et al. .................. 75/5 |
| 3,631,073 A | 12/1971 | Cohn et al. ................ 252/373 |
| 3,667,985 A | 6/1972 | Levine et al. ................ 117/22 |
| 4,027,367 A | 6/1977 | Rondeau ..................... 428/652 |
| 4,238,468 A | 12/1980 | Bonacci et al. ............. 423/359 |
| 4,414,023 A | 11/1983 | Aggen .......................... 75/124 |
| 4,440,874 A | 4/1984 | Thompson ................... 502/327 |
| 4,492,769 A | 1/1985 | Blanchard et al. .......... 502/262 |
| 4,492,770 A | 1/1985 | Blanchard et al. .......... 502/304 |
| 4,617,289 A | 10/1986 | Saito et al. ................. 502/339 |
| 4,621,071 A | 11/1986 | Blanchard et al. .......... 502/302 |
| 4,671,931 A | 6/1987 | Herchenroeder et al. ... 420/445 |
| 4,749,671 A | 6/1988 | Saito et al. .................. 502/64 |
| 4,818,745 A | 4/1989 | Kolts ........................... 502/327 |
| 4,844,837 A | 7/1989 | Heck et al. ................. 252/373 |
| 4,920,088 A | 4/1990 | Kolts ........................... 502/326 |
| 4,940,686 A | 7/1990 | Tooley et al. ............... 502/327 |
| 4,969,329 A | 11/1990 | Bolton et al. ................. 60/288 |
| 5,017,357 A | 5/1991 | Kolts et al. |
| 5,075,274 A | 12/1991 | Kiyohide et al. ............ 502/303 |
| 5,108,977 A | 4/1992 | Yoshida et al. ............. 502/304 |
| 5,157,204 A | 10/1992 | Brown et al. |
| 5,170,624 A | 12/1992 | Cornelison et al. .......... 60/300 |
| 5,204,302 A | 4/1993 | Gorynin et al. ................ 502/2 |
| 5,208,203 A | 5/1993 | Horiuchi et al. ............ 502/302 |
| 5,258,340 A | 11/1993 | Augustine et al. ............ 502/60 |
| 5,536,695 A * | 7/1996 | Blejean et al. .............. 502/327 |
| 5,559,073 A | 9/1996 | Hu et al. ..................... 502/302 |
| 5,583,087 A | 12/1996 | Slotte ........................... 502/327 |
| 5,591,414 A | 1/1997 | Jacob et al. ................. 422/180 |
| 5,597,771 A | 1/1997 | Hu et al. ..................... 502/304 |
| 5,674,460 A | 10/1997 | Plog et al. |
| 5,735,158 A | 4/1998 | Brunson ...................... 72/196 |
| 5,776,423 A | 7/1998 | Feeley et al. ............. 423/239.2 |
| 5,866,500 A * | 2/1999 | Taguchi et al. ............. 502/327 |

FOREIGN PATENT DOCUMENTS

| | | | |
|---|---|---|---|
| CA | 609619 | 11/1960 | |
| WO | WO 98/15354 | 4/1998 | |
| WO | WO 00/33955 | 6/2000 | ............ B01J/23/42 |

OTHER PUBLICATIONS

A. Jatkar, "A New Catalyst Support Structure for Automotive Catalytic Converters", SAE Technical Paper Series No. 971032, International Congress & Exposition, Detroit, Michigan, Feb. 24–27, 1997, pp. 149–186.
A.N. Pestryakov, "Catalysts Based on Foam Metals", Materials and Ecology, Journal of Advanced Materials, 1994, 1(5), pp. 471–476.
Palke, D.R., et al, "Durable Catalytic Aftertreatment of Motorcycle Exhaust", SAE Paper #962473, Symposium on International Automotive Technology '96, pp. 2029–2036.
Reck et al, "Metallic Substrates and Hot Tubes For Catalytic Converters in Passenger Cars, Two–and Three–Wheelers", SAE Paper 962473, Dec. 1996, Abstract only.
E. Luccini et al; "Preparation of zirconia–ceria powders by coprecipitation of a mixed zirconium carbonate in water with urea"; Int. J. of Materials and Product Technology, vol. 4, No. 2, 1989, pp. 167–175.
H.C. Andersen et al; "Removing Carbon Monoxide From Ammonia Synthesis Gas", 53 Industrial Engineering Chemistry, No. 8, Aug. 1961, pp. 645–646.
M.L. Brown, Jr. et al; "Purifying Hydrogen by . . . Selective Oxidation of Carbon Monoxide", 52 Industrial Engineering Chemistry, No. 10, Oct. 1960, pp. 841–844.

* cited by examiner

*Primary Examiner*—Stuart L. Hendrickson
(74) *Attorney, Agent, or Firm*—Russell G. Lindenfeldar

(57) ABSTRACT

The invention pertains to the preparation and use of catalytic materials and catalyst members for the selective oxidation of carbon monoxide in a gas stream that contains hydrogen. One such catalyst member may be produced by depositing by electric arc spraying a metal feedstock onto a metal substrate to provide a metal anchor layer on the substrate, and depositing a catalytic material comprising platinum and iron dispersed on a refractory inorganic oxide support material onto the metal substrate. The catalytic material may optionally be produced by wetting the support material, especially a particulate support material, with a platinum group metal solution and iron solution and drying and calcining the wetted support material in air at a temperature in the range of from 200° C. to 300° C., preferably using a solution containing bivalent platinum ion species. The catalyst member may be used by flowing the gas stream therethrough at a temperature at about 90° C. with a $O_2$:CO ratio of about 1:1 and a space velocity of about 20,000/hr or, alternatively, at a temperature of about 150° C. with a $O_2$:CO ratio of about 1.5:1 and a space velocity of about 80,000/hr.

10 Claims, 21 Drawing Sheets

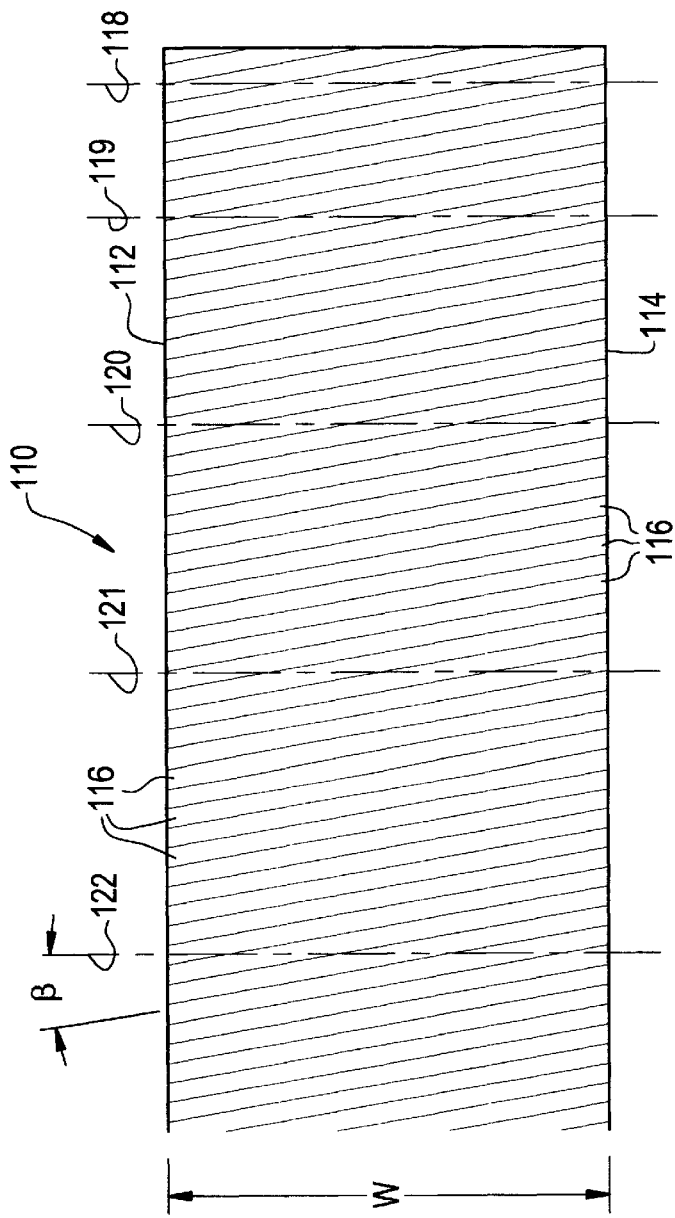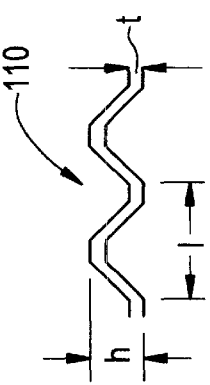

FIG. 3G
FIG. 3H
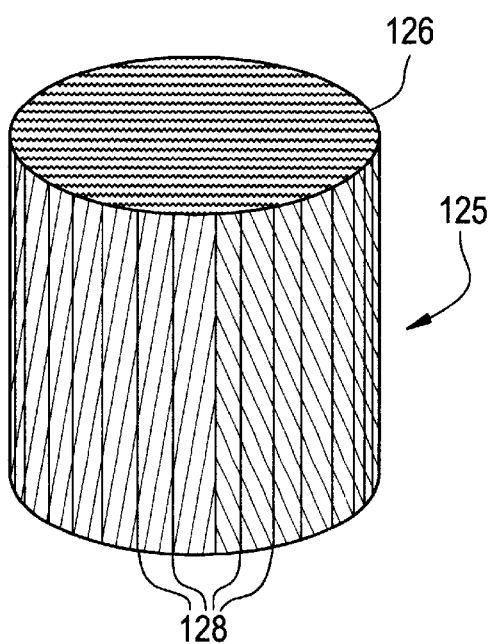
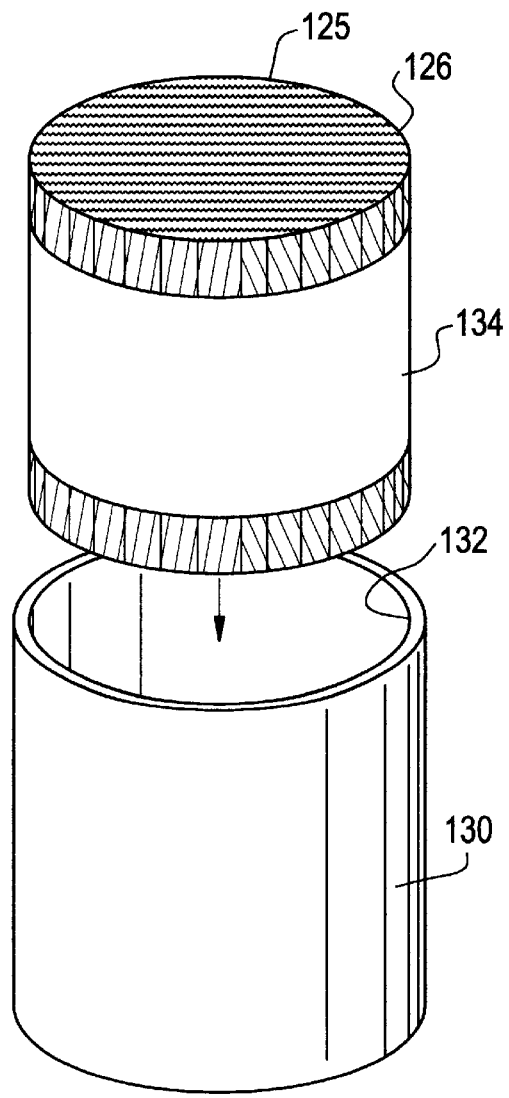

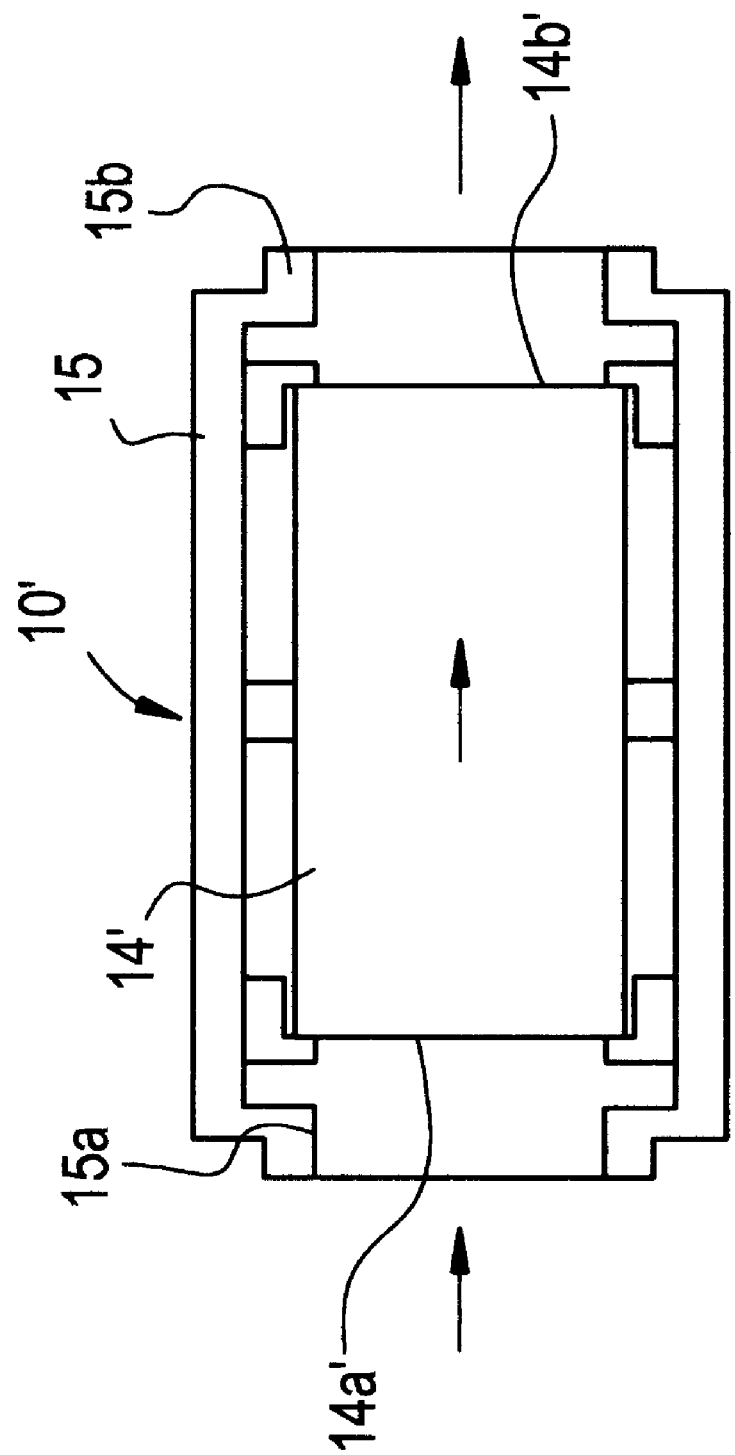

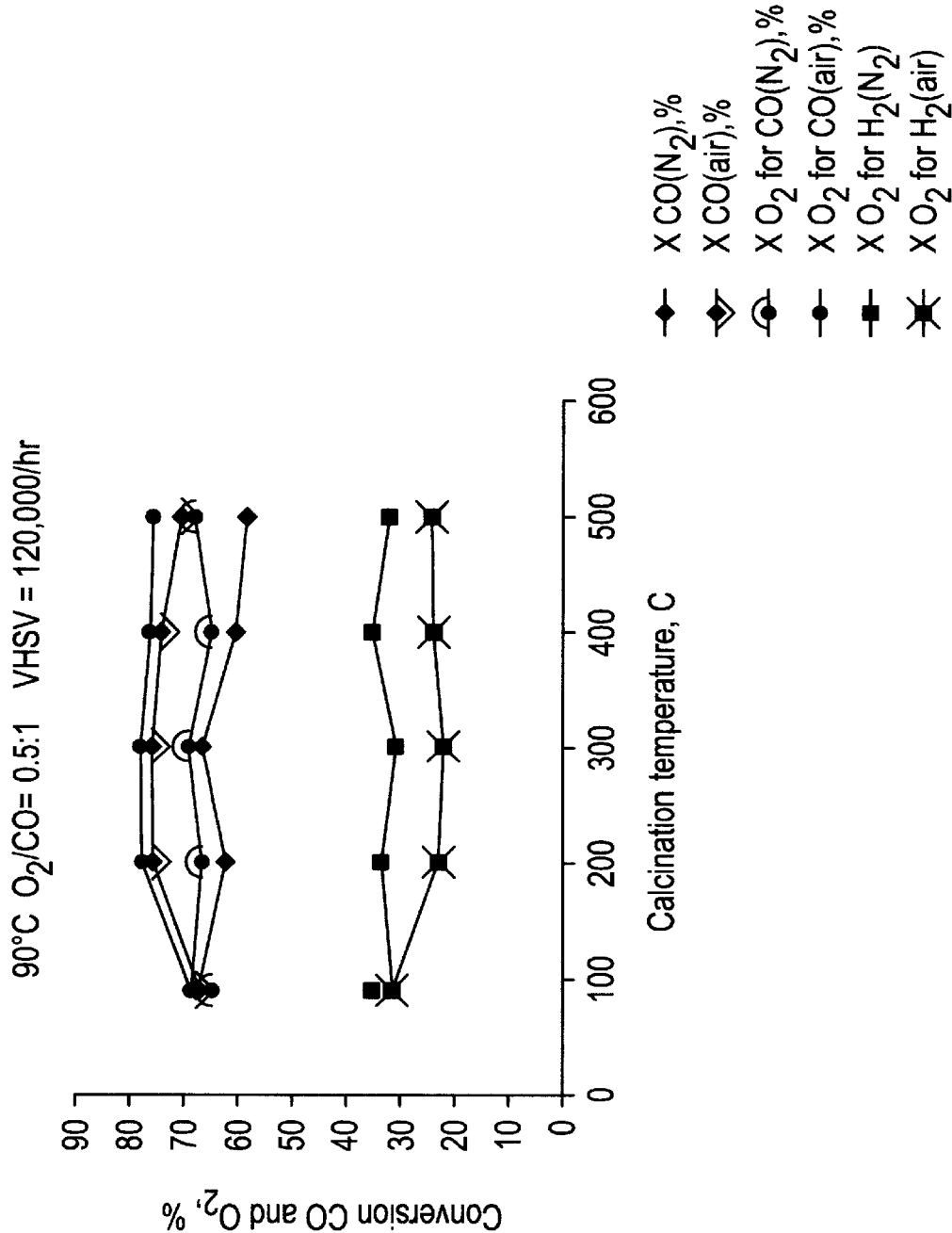

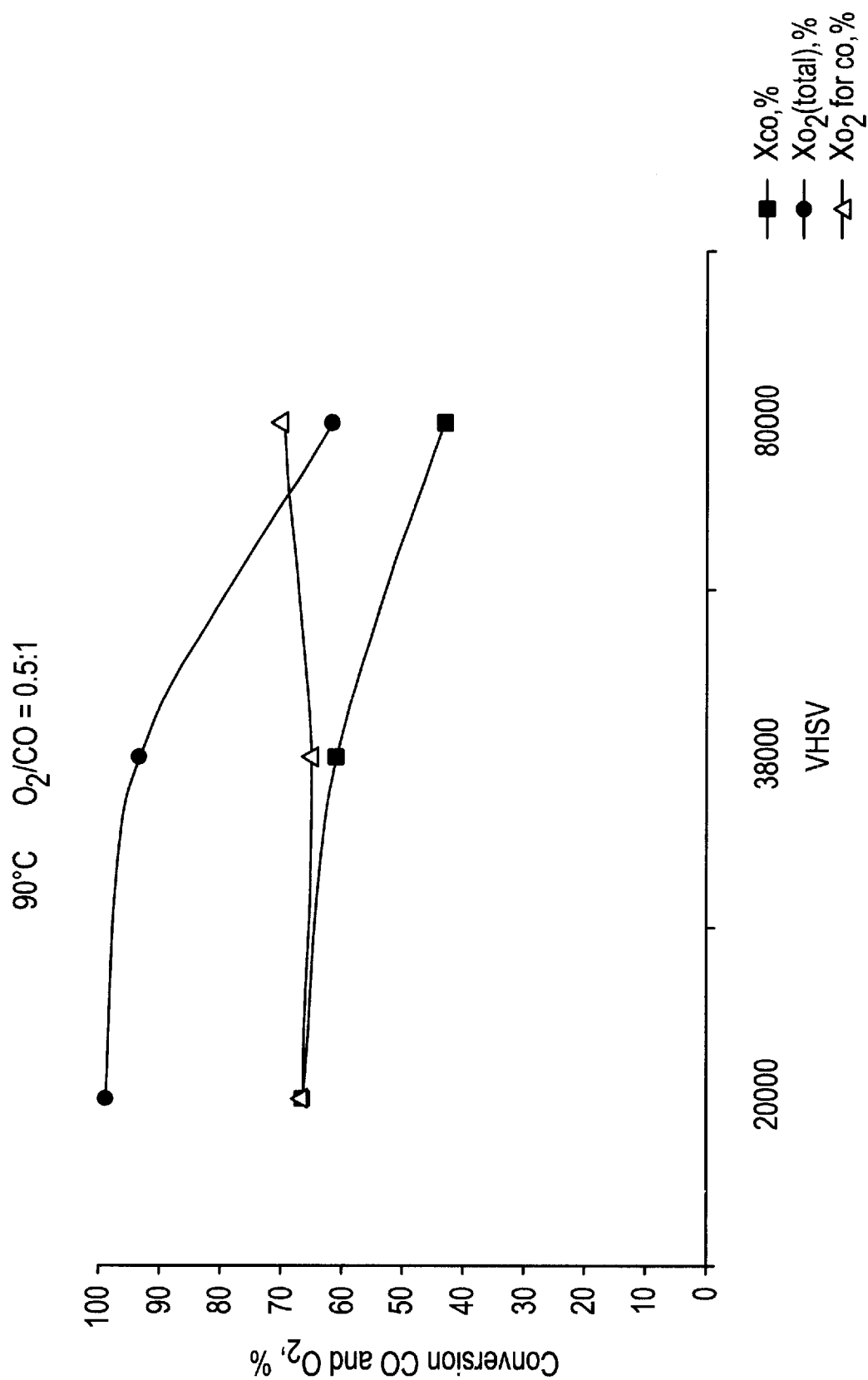

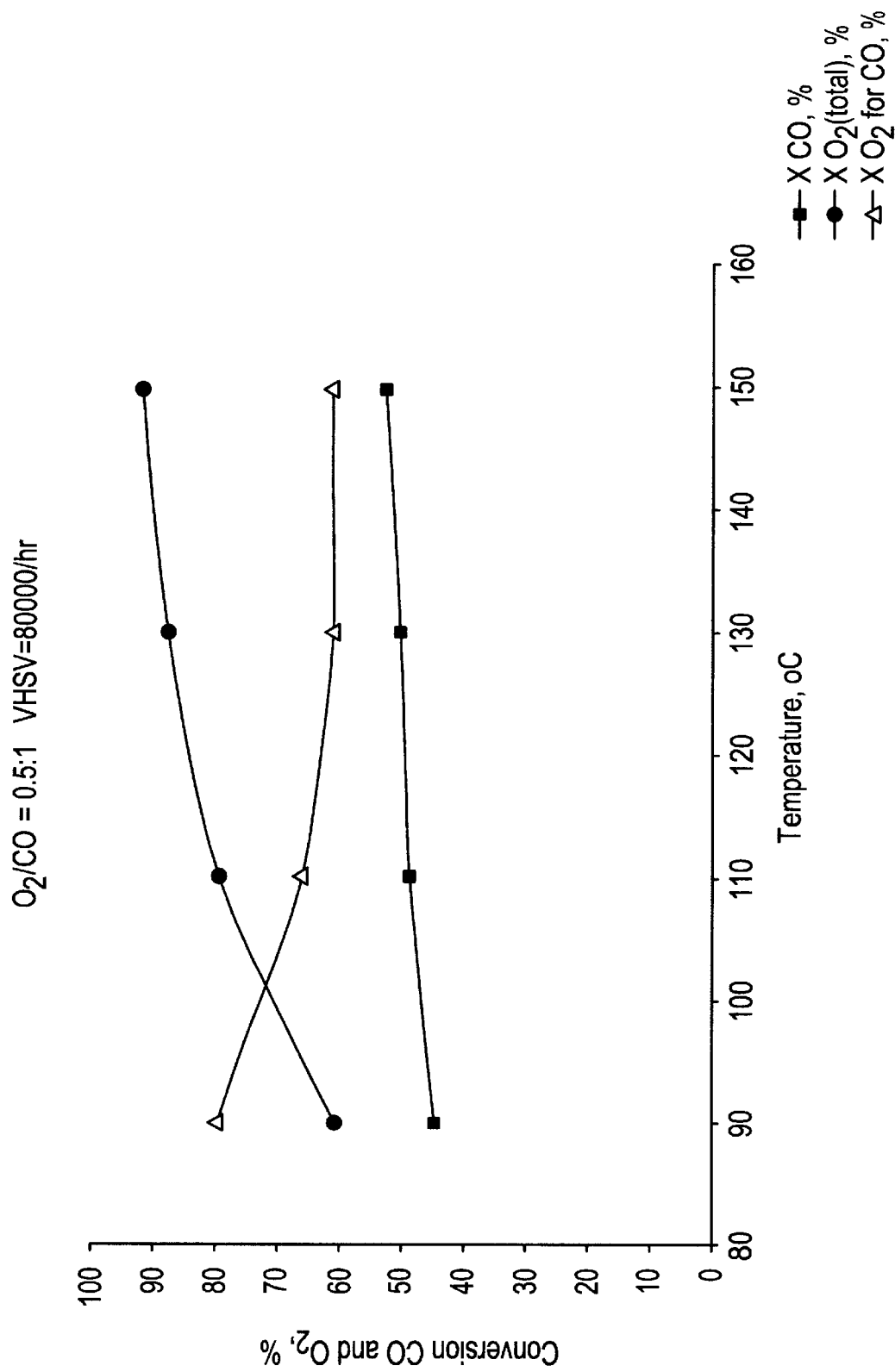

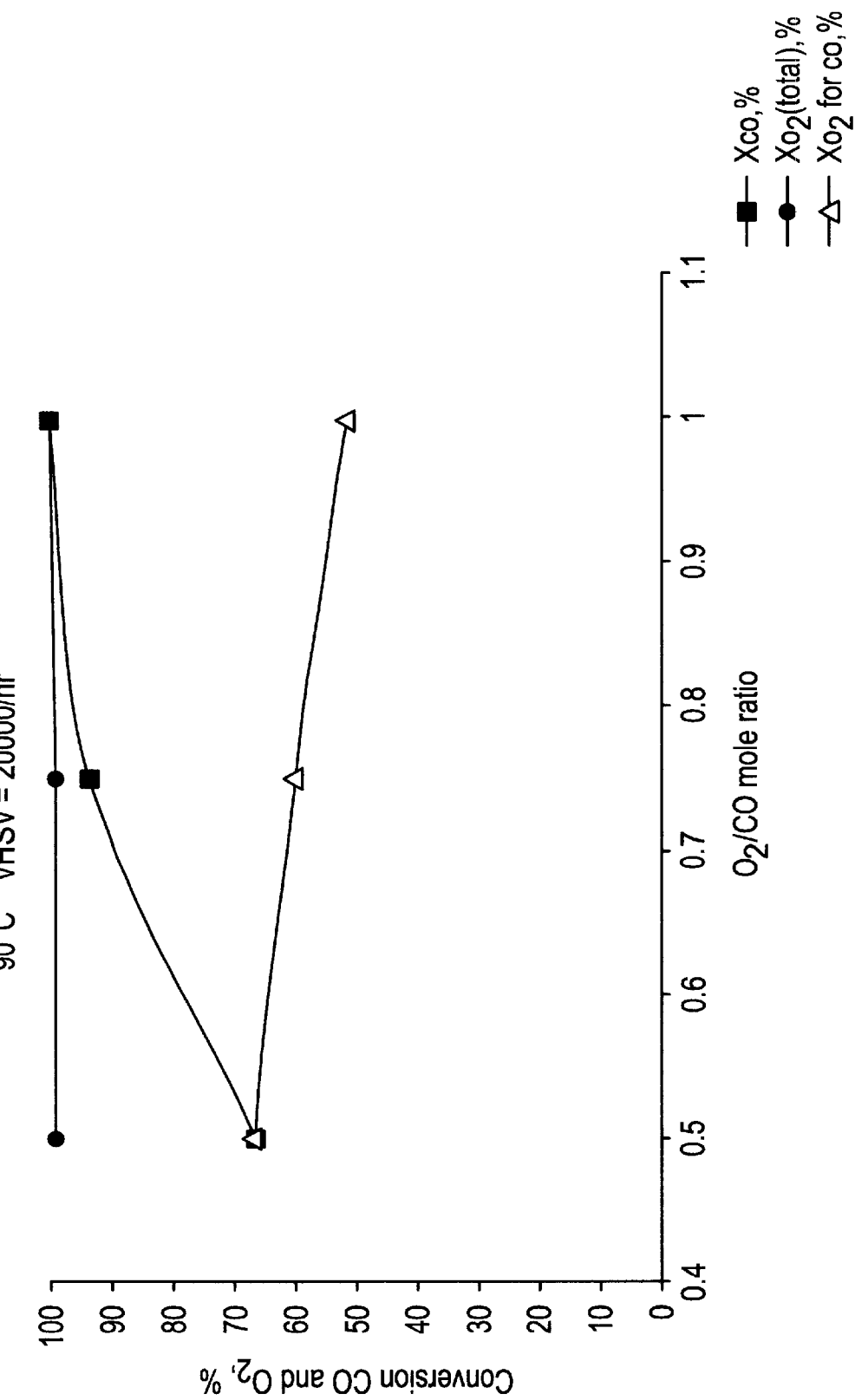

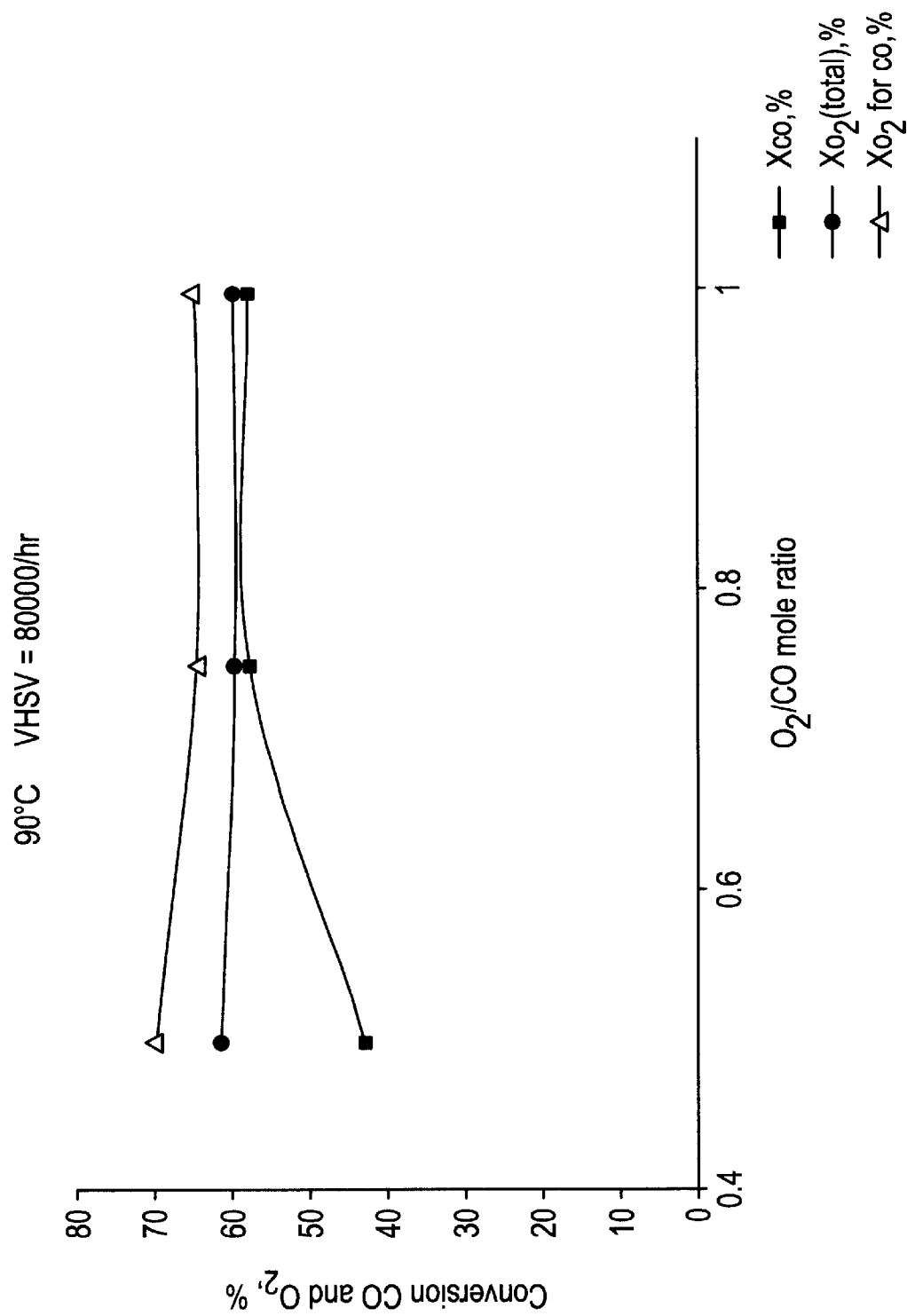

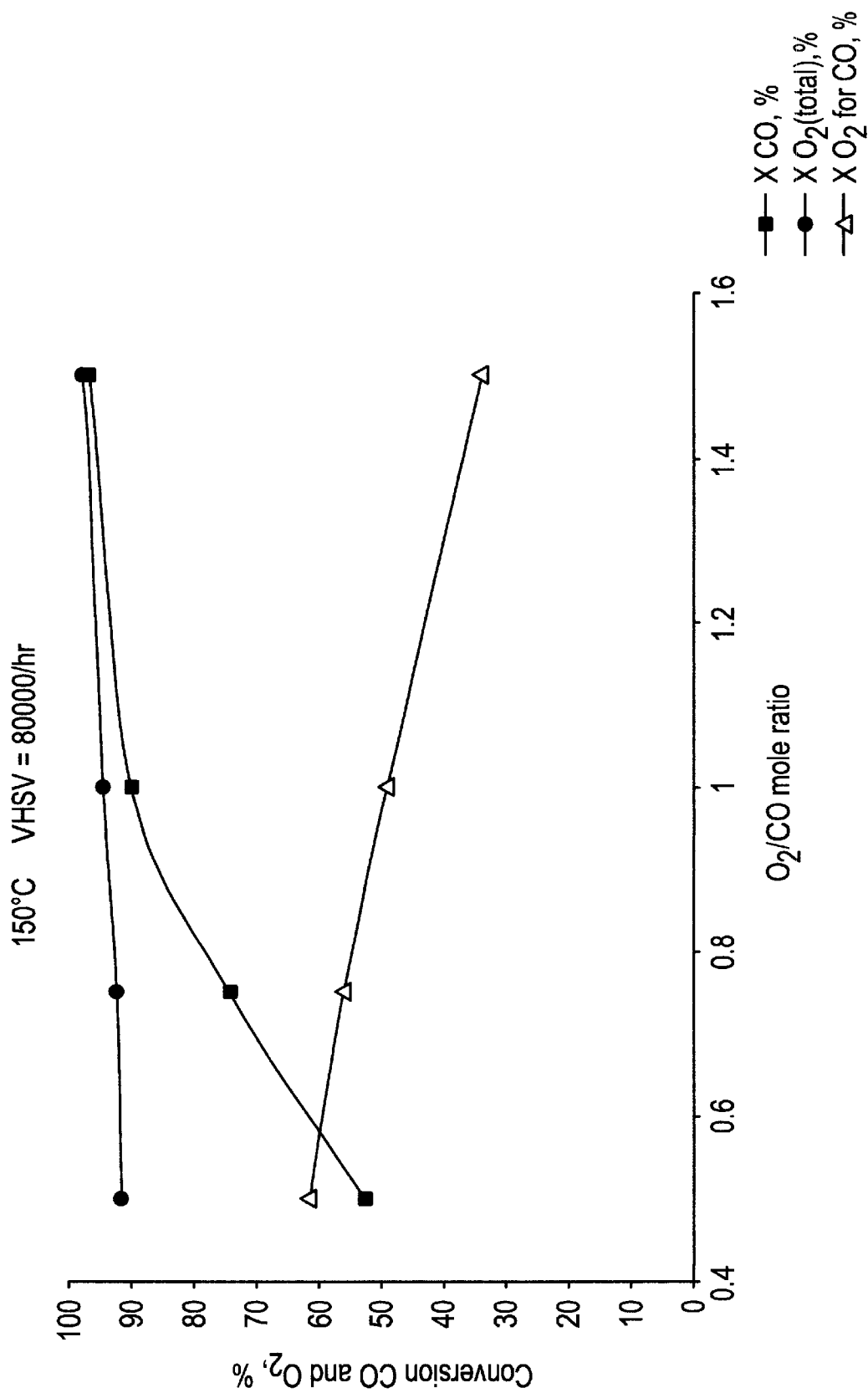

METHOD FOR PREPARATION OF CATALYTIC MATERIAL FOR SELECTIVE OXIDATION AND CATALYST MEMBERS THEREOF

BACKGROUND OF THE INVENTION

1. Field of the Invention

This invention relates to the preparation of catalytic material for use in the selective oxidation of carbon monoxide, to catalyst members comprising such materials and to the conditions of their use. The invention finds utility in the preparation of hydrogen-containing gas streams for use in fuel cells, which generate power by the oxidation of hydrogen.

A known strategy for the use of fuel cells involves the generation of hydrogen from carbonaceous fuels. Generally, this process involves subjecting the fuel to desulfurization, steam reforming and high- and low-temperature water-gas shift reactions. The resulting gas stream comprises significant quantities of hydrogen ($H_2$), carbon dioxide ($CO_2$), water ($H_2O$) and about 0.5% carbon monoxide (CO). The aforesaid quantity of CO is greater than desired for fuel cell purposes, since CO is known to poison the catalyst for the fuel cell reaction. It is therefore necessary to remove some or all of the CO, e.g., by oxidizing it to $CO_2$, without removing the $H_2$ needed to power the fuel cell. The CO must be removed or reduced to a maximum of about 10 ppm. In a prior art process known under the trade name SELECTOXO™, the product of the water-gas shift reactions is stripped of CO in a catalytic selective oxidation process that avoids oxidation of $H_2$. The commercial SELECTOXO™ catalyst involved comprises from 0.3 to 0.5% platinum and 0.03% iron dispersed on alumina support tablets or pellets by wet impregnation of the alumina with a solution of platinum and iron salts. The SELECTOXO™ catalyst material was dried at not more than 125° C. because it was expected that that catalyst would be used at temperatures not higher than 125° C. and that a higher drying temperature would detrimentally affect the platinum. The catalyzed alumina tablets are typically assembled into a bed through which the feed stream is flowed.

2. Related Art

U.S. Pat. No. 3,088,919 to Brown, Jr. et al, entitled "Treatment Of Gases" and dated May 7, 1963, discloses a process for the preferential oxidation of carbon monoxide in a hydrogen-containing gas, in particular, ammonia synthesis gas. According to the disclosed process, the gas is treated with water and is then passed over a supported platinum catalyst (see col. 1, lines 34–39). The platinum is loaded at from 0.01 to 5 weight percent of the catalyst (col. 3, lines 25–27). The Patent states that the selective oxidation process may be carried out at temperatures from 60° F. to 1200° F. (15° C. to 650° C.), preferably 200° F. to 450° F. (93° C. to 232° C.) (see col. 3, lines 4–6). Example III discloses a process for oxidizing carbon monoxide using a platinum catalyst at a catalyst temperature bed in the range of 230° C. to 500° F. (110° C. to 260° C.). The inlet gas contained 1.7 percent carbon monoxide (CO) and the exit gas contained up to 4,000 parts per million CO. The pressure may be from atmospheric to 300 psig (col. 3, line 7) and the space velocity of the gas through the catalyst may be 100 to 25,000 $ft^3$ gas/$ft^3$ catalyst per hour, preferably 4,000 to 6,000 $ft^3$ gas/$ft^3$ catalyst per hour for a single-stage operation (col. 3, lines 8–17).

U.S. Pat. No. 3,216,783 to Cohn, dated Nov. 9, 1965 and entitled "Process For Selectively Removing Carbon Monoxide From Hydrogen-Containing Gases", discloses the use of a supported platinum catalyst containing from 0.01 to 5 weight percent platinum on pelleted, powdered or granulated support material, for use in oxidizing carbon monoxide (col. 1, lines 53–62) at a reaction temperature in the range of 110° C. to 200° C. (col. 1, lines 35–42). The space velocity of the gas is in the range of from 500 to 100,000 VHSV at 70° F. (21.1° C.).

U.S. Pat. No. 4,492,769 to Blanchard et al, dated Jan. 8, 1985 and entitled "Pollution Control Catalyst For Internal Combustion Engine Exhaust System/Catalytic Converter and Process For Its Preparation", discloses the preparation of certain platinum-containing catalysts with calcining of 300° C. (Examples 2, 3, 4, 5).

U.S. Pat. No. 5,583,087 to Slotte, entitled "Method For Impregnating Catalyst Support With Platinum", dated Dec. 10, 1996, discloses a method for the preparation of a catalytic material that may comprise platinum dispersed on alumina by a wet impregnation technique. In accordance with the teachings of this Patent, a solution of bivalent platinum is prepared, the bivalent platinum is oxidized to $Pt^{+4}$, e.g., by adding hydrogen peroxide or ozone, and the $Pt^{+4}$ solution is then impregnated into the support material, preferably via chemisorption. The wetted support material is then calcined at 275° C. (see col. 3, lines 29–40).

U.S. Pat. No. 4,818,745 to Kolts, entitled "Catalyst For Oxidation Of Carbon Monoxide And Process For Preparing The Catalyst", dated Apr. 4, 1989, discloses a catalyst for the oxidation of carbon monoxide under conditions suitable for laser applications. The catalyst comprises platinum and/or palladium dispersed on alumina via impregnation. The catalyst may contain from 0.5 to 5 weight percent platinum and/or palladium (col. 4, lines 22–29). Iron is also used in the catalyst at a loading of from about 0.2 to 4 weight percent (col. 4, lines 54–57). The preparation method includes drying and calcining the wetted support material in two stages, first at temperatures of about 30° C. to about 200° C. and then in the range of from about 300° C. to about 700° C. The material is then subjected to reducing conditions by exposure to a reducing gas at a temperature of about 550° C. to 700° C. The feed gases for the carbon monoxide oxidation processes described therein are substantially free of hydrogen.

U.S. Pat. No. 4,440,874 to Thompson entitled "Catalyst Composition And Method For Its Manufacture", dated Apr. 3, 1984, discloses a method for the preparation of a catalytic material used for the purification of exhaust gases from internal combustion engines. The catalytic material may comprise platinum and iron and is prepared using a wet impregnation technique to deposit the catalytic metals on an alumina support material. This Patent illustrates drying and calcining the wetted support material at 450° C. (col. 7, lines 57–61).

U.S. Pat. No. 4,749,671 to Saito et al entitled "Exhaust Gas Cleaning Catalyst And Process For Production Thereof", dated Jun. 7, 1988, discloses a catalytic material useful for cleaning diesel engine exhaust gases or other exhaust gases containing combustible carbonaceous particles. The catalytic material may comprise platinum and iron supported on alumina (see col. 3, lines 40–61). The disclosed method of preparation involves impregnating alumina pellets with a solution of the catalytic metals, drying and calcining the pellets and then grinding them and forming them into a slurry for coating on a carrier. In each example, the wetted support aterial was dried and then calcined at temperatures of 500° C. or 600° C.

U.S. Pat. No. 4,621,071 to Blanchard et al, dated Nov. 4, 1996, entitled "Composite Catalyst For Treatment Of Vehicular Exhaust Gases . . . ", discloses catalytic materials for the treatment of vehicular exhaust gases. The disclosed materials may comprise platinum and iron dispersed on a support material that may be alumina. This Patent teaches that the support material is impregnated with a solution containing the catalytic metals and is then dried and calcined at a temperature of 300° C. to 800° C. (see col. 6, lines 53–63). The catalyst is then "activated" by exposure to a reducing atmosphere at a temperature between 200° C. and 700° C. (see col. 6, lines 64–68). In Examples 3 and 4 of this Patent, impregnated alumina materials were dried at 150° C. and then activated at 350° C. In Example 6, an impregnated material was dried at 150° C. and then calcined at 350° C. in air (see col. 11, lines 13–20).

The following references address selective oxidation of carbon monoxide: U.S. Pat. No. 3,631,073 to Cohn, dated December 28, 1971; Canadian Patent 609,619 to Cohn, dated Nov. 29, 1960; Brown, Jr. et al, "Purifying Hydrogen by Selective Oxidation of Carbon Monoxide", 52 Industrial Engineering Chemistry, No. 10, October 1960, page 841; Anderson et al, "Removing Carbon Monoxide From Ammonia Synthesis Gas", 53 Industrial Engineering Chemistry, No. 8, August 1961, page 645.

U.S. Pat. No. 5,204,302, issued Apr. 20, 1993 to I. V. Gorynin et al, is entitled "Catalyst Composition and a Method For Its Preparation" and is hereinbelow referred to as "the '302 Patent". The '302 Patent discloses a multi-layered catalyst material supported on a metal substrate. The metal substrate (column 4, lines 64–68) may be any thermally stable metal including stainless steel and low alloy steel, the '302 Patent stating that, regardless of which type of substrate is used, there is no appreciable difference in the performance of the bonded layers. As illustrated in FIG. 1 of the Patent and described at column 4, line 32 et seq, a flame spraying or plasma spraying apparatus (FIG. 2 and column 5, line 32 et seq) is used to apply an adhesive sublayer 12 to metal substrate 11, which is shown in solid cross section as a dense (solid) plate-like structure. Adhesive sublayer 12 contains a self-bonding intermetallic compound formed from any one of a number of metal pairings, including aluminum and nickel, as described at column 5, lines 1–6 of the '302 Patent. The high temperature of the flame or plasma spray operation is said to generate a diffusion layer (13 in FIG. 1) caused by diffuision of material of substrate 11 and sublayer 12 across their interface (column 4, lines 37–41). A catalytically active layer 14 (FIG. 1) is sprayed atop the sublayer 12 and has a gradient composition with an increasing content of catalytically active material as one proceeds away from the interface (column 5, lines 7–24). The catalytically active layer can be alumina, preferably gamma-alumina, and may further include specified metal oxide stabilizers such as CaO, $Cr_2O_3$, etc., and metal oxide catalytic materials such as $ZrO_2$, $Ce_2O_3$, etc. A porous layer 18 (FIG. 1 and column 5, lines 25–32) contains some catalytically active components and transition metal oxides as decomposition products of pore forming compounds such as $MnCO_3$, $Na_2CO_3$, etc., which presumably form pores as gases evolve from the carbonates or hydroxides (column 7, lines 40–45) as they thermally decompose (see column 7, lines 37–45). As described at column 5, line 44 et seq and at column 7, line 37 et seq, sublayer 12, catalytically active layer 14 and porous layer 18 may be applied by a continuous plasma spray operation in which different ones of the powders 21, 28 and 33 (FIG. 2) are fed into the plasma spray in a preselected sequence and at preselected intervals. An optional activator coating 19 may be applied onto the porous layer, preferably by magnetron sputtering (see column 4, lines 56–63 and column 8, lines 24 et seq).

U.S. Pat. No. 4,027,367, issued Jun. 7, 1977 to H. S. Rondeau, which is incorporated herein by reference, is entitled "Spray Bonding of Nickel Aluminum and Nickel Titanium Alloys" and is hereinbelow referred to as "the '367 Patent". The '367 Patent discloses a method of electric arc spraying of self-bonding materials, specifically, nickel aluminum alloys or nickel titanium alloys, by feeding metal constituent wires into an electric arc spray gun (column 1, lines 6–13). The '367 Patent mentions, starting at column 1, line 25, combustion flame spray guns, e.g., guns feeding a mixture of oxygen and acetylene to melt a powder fed into the flame. Such combustion flame spray guns are said to operate at relatively low temperature and are often incapable of spraying materials having melting points exceeding 5,000° F. (2,760° C.). The '367 Patent also mentions (starting at column 1, line 32) that plasma arc spray guns are the most expensive type of thermal spray devices and produce much higher temperatures than combustion-type flame spray guns, up to approximately 30,000° F. (16,649° C.). It is further pointed out in the '367 Patent that plasma arc spray guns require a source of inert gas for the creation of plasma as well as extremely accurate control of gas flow rate and electric power for proper operation. In contrast, starting at column 1, line 39, electric arc spray guns are stated to simply require a source of electric power and a supply of compressed air or other gas to atomize and propel the melted material in the arc to the substrate or target. The use of electric arc spraying with a wire feed of nickel aluminum or nickel titanium alloys onto suitable substrates, including smooth steel and aluminum substrates is exemplified starting at column 5, line 28, but no mention is made of open, porous or honeycomb-type substrates, or ceramic substrates and there is no suggestion for the use of the resulting articles as carriers for catalytic materials.

U.S. Pat. No. 3,111,396 to Ball, dated Nov. 19, 1963 (hereinafter referred to as "the '396 Patent") and entitled "METHOD OF MAKING A POROUS MATERIAL", discloses a method for making a porous metal material or "metal foam". Essentially, the method comprises forming a porous organic structure such as a mesh, cloth, or a cured foam structure such as an open pore sponge, impregnating the structure with a fluid suspension of powdered metal in a liquid vehicle, and drying and heating the impregnated structure to remove the liquid vehicle and then further heating the organic structure to decompose it and to sinter the metal powder into a continuous form. The resulting metallic structure, while not foamed during the manufacturing process, is nevertheless described as foamed because its ultimate structure resembles that of a foamed material.

SAE (Society of Automotive Engineers) Technical Paper 971032, entitled *A New Catalyst Support Structure For Automotive Catalytic Converters* by Arun D. Jatkar, was presented at the International Congress and Exposition, Detroit, Mich., Feb. 24–27, 1997. This Paper discloses the use of metal foams as a substrate for automotive catalysts. The Paper describes the use of various metal foams as catalyst substrates and notes that foams made of pure nickel or nickel-chromium alloys were not successful as substrates for automotive catalysts because of corrosion problems encountered in the environment of an automotive exhaust catalyst. Metal foams made from Fecralloy and ALFA-IV® ferritic stainless steel powders were said to be successful, at least in preliminary tests, for use as substrates for automotive catalysts. A ceramic washcoat having a precious metal loading was deposited onto disks of ALFA-IV® metal foam produced by Astro Met, Inc. The washcoat comprised gamma-alumina and cerium oxide on which platinum and rhodium in a ratio of 4:1 were dispersed to provide a loading of 40 grams of the precious metal per cubic foot of the foam-supported catalyst. Such catalyzed substrates were said to be effective in treating hydrocarbon emissions.

In an article entitled "Catalysts Based On Foam Metals", published in *Journal of Advanced Materials*, 1994, 1(5) 471–476, Pestryakov et al suggest the use of foamed metal as a carrier substrate for catalytic materials for the catalytic neutralization of exhaust gases of car engines. The use of an intermediate layer of high surface area alumina between the metallic foam and the catalytic material is recommended, by direct deposition on the foam carrier. In addition to increasing the surface area of the substrate, the alumina is also credited with protecting the surface of the substrate against corrosion.

SAE Paper 962473 by Reck et al of EMITECH, GmbH, entitled "Metallic Substrates and Hot Tubes For Catalytic Converters in Passenger Cars, Two- and Three-Wheelers", addresses the use of catalytic converters and hot tubes to treat the exhaust of scooters and motorcycles, especially those having two-stroke engines.

A supplier of wire mesh carriers for catalytic materials known as OptiCat offers for sale wire mesh comprising wire that has been plasma spray coated to form a rough surface thereon to improve the adherence of a catalytic material deposited thereon.

Prior art attempts to adhere catalytic materials to metallic substrates include the use of ferrous alloys containing aluminum. The alloy is formed into a substrate structure and is heat-treated under oxidizing conditions. The aluminum oxidizes, forming whiskers of alumina that project from the substrate surface and are believed to provide anchors for catalytic materials. The use of other alloying elements, e.g., hafnium, in ferrous metals for this purpose is known to provide such whiskers upon oxidizing treatment.

SUMMARY OF THE INVENTION

In one aspect, the present invention relates to a method of preparing a catalytic material. The method comprises wetting a refractory inorganic oxide support material with a bivalent platinum solution and iron solution and drying and calcining the wetted support material under oxidizing conditions at a temperature in the range from 200° C. up to but not including 300° C. If the catalytic material is substantially free from at least one of palladium, rhodium and cerium, the temperature range may include 300° C.

According to one aspect of the invention, the support material may be a powdered support material such as powdered alumina. Alternatively, the support material may comprise a pelletized support material.

This invention also provides a method of preparing a catalyst member comprising wetting a monolith comprising a refractory material with a bivalent platinum solution and iron solution and drying and calcining the wetted monolith under conditions described above.

The invention also pertains to the catalytic material and catalyst members produced by the methods described herein.

This invention further provides a catalyst member comprising at least one tube mounted in a housing defining two fluid flow paths therethrough, the at least one tube having a catalytic material deposited thereon for exposure to at least one fluid flow path. The catalytic material may be prepared by any one of the methods described above.

This invention further provides a method for oxidizing carbon monoxide in a gas stream containing carbon monoxide, hydrogen and oxygen, comprising contacting the gas stream at a temperature less than 300° C. with a catalytic material or catalyst member as described herein.

The method may comprise contacting the gas stream at a temperature of about 90° C. with a $O_2$:CO ratio of about 1:1 and a space velocity of about 20,000/hr or, alternatively, at a temperature of about 150° C. with a $O_2$:CO ratio of about 1.5:1 and a space velocity of about 80,000/hr.

A further method of this invention for treating a gas containing carbon monoxide, hydrogen and oxygen comprises flowing the gas through a first flow path in a catalyst member having at least two flow paths therethrough with gas in the second flow path whereby to exchange heat between the gases in the two flow paths.

BRIEF DESCRIPTION OF THE DRAWINGS

FIG. 3E is a plan view illustrating a fragment of a skewed corrugated strip used in the invention;

FIG. 3F is an enlarged fragmentary side profile of the corrugated strip shown in FIG. 3E;

FIG. 3G is a perspective view illustrating a honeycomb carrier core body formed by folding the strip shown in FIG. 3E;

FIG. 3H is an exploded perspective view depicting the assembly of the core body with a jacket tube;

FIG. 5 is a schematic cross-sectional view of an exhaust gas treatment apparatus including two foamed metal regions of different densities according to the present invention;

FIG. 6 is a plot showing the conversion of CO and consumption of $O_2$ and $O_2$ selectivity exhibited by catalytic materials calcined alternatively in air or $N_2$ and at various temperatures;

FIG. 7 is a plot showing conversion of CO, consumption of $O_2$ and $O_2$ selectivity for a feed stream tested at various space velocities;

FIG. 8 is a plot showing conversion of CO, consumption of $O_2$ and $O_2$ selectivity over a range of temperatures;

FIG. 9 is a plot showing conversion of CO, consumption of $O_2$ and $O_2$ selectivity at a variety of $O_2$:CO ratios in gas streams tested at 20,000 VHSV and 90° C.;

FIG. 10 is a plot similar to FIG. 9 for gas streams tested at 80,000 VHSV and 90° C.; and FIG. 11 is a plot showing conversion of CO, consumption Of $O_2$ and $O_2$ selectivity at a variety of $O_2$:CO ratios in gas streams tested at 80,000 VHSV and 150° C.

DETAILED DESCRIPTION OF THE INVENTION AND PREFERRED EMBODIMENTS THEREOF

Figure 1B:
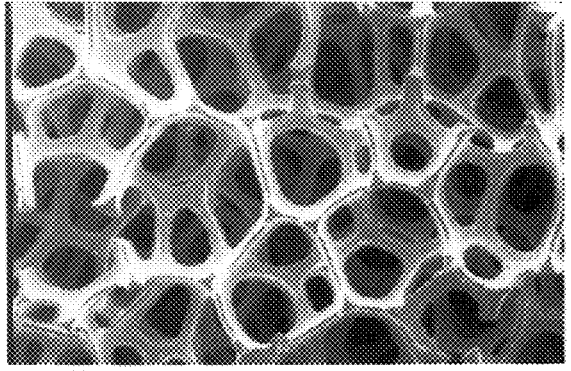
FIGS. 1A–1D are photomicrographs of a foamed metal substrate without an anchor layer deposited thereon, at magnifications of 38×, 55×, 152× and 436×, respectively.
Figure 1A:
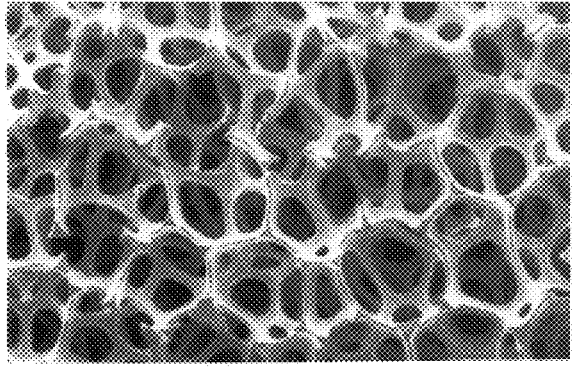
Figure 1C:
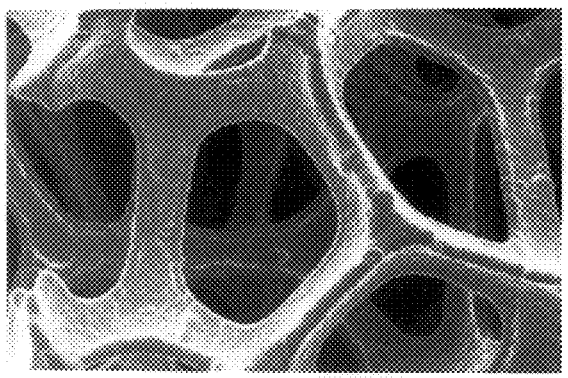
Figure 1D:
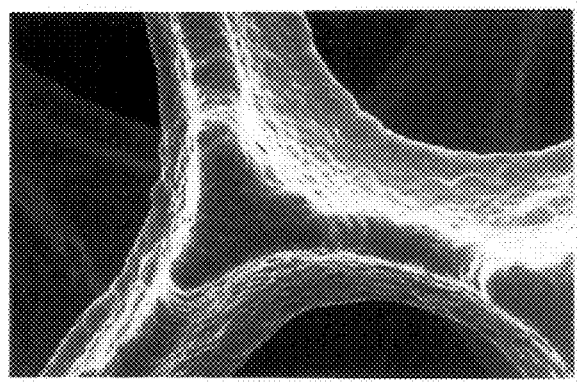

One aspect of the present invention relates to the use of particular catalysts useful for the selective oxidation of carbon monoxide in an oxygen- and hydrogen-containing gas, to a method of preparing such catalysts and to the products of the method. The selective or preferential oxidation of carbon monoxide in a gas stream containing a significant quantity of hydrogen is required in various processes, e.g., for removing carbon monoxide from the gas stream effluent from high- and low-temperature water-gas shift reactions to produce a fuel cell feed stream. Such gas streams typically contain at least 5 percent, preferably at least 10 percent, more preferably at least 20 percent, hydrogen by weight and about 0.5 percent CO. The water-gas shift gas stream product is typically contacted with a catalytic material prepared in accordance with the present invention at a process temperature lower than about 200° C., often at low or ambient temperature, e.g., 125° C., or lower. The amount of CO in the gas stream is reduced to not more than about 0.001 weight percent, preferable to less than 10 parts per million (ppm). Accordingly, the rate of CO conversion should be at least about 95%, preferably at least about 98%.

The Applicants have made the surprising discovery that superior catalytic activity for the selective oxidation of carbon monoxide can be obtained by using a catalyst comprising platinum and iron that have been impregnated onto a support material or monolith which was then dried and calcined under oxidizing conditions, e.g., in air, in the temperature range of from 200° C. to 300° C. The prior art does not recognize the advantage of the use of materials calcined in this range for the selective oxidation processes described herein. The present invention also relates to a method for the preparation of a catalyst and catalytic material and to the products of the method. The method comprises wetting a support material such as alumina (or a monolith of such material) with platinum and iron in solution and calcining the wetted material or monolith in oxidizing conditions, e.g., in air, at temperatures in the range of from 200° C. up to, but not including, 300° C. The prior art (e.g., U.S. Pat. No. 4,492,769 (discussed above)) fails to suggest the use of such material for the selective oxidation of carbon monoxide in a hydrogen-containing gas stream, and it shows the use of catalytic metals not necessarily found in the platinum- and iron-containing catalyst of the present invention. Accordingly, the methods, catalytic material and catalyst members according to the present invention may optionally be substantially free of at least one, any two or, optionally, all three metals selected from the group consisting of palladium, rhodium and cerium. They may optionally be free of any one or more of barium, copper and/or manganese. The calcination temperature range can optionally be limited to the non-inclusive range of from 200° C. up to, but not including, 300° C. According to this aspect of the invention, the platinum-containing catalytic material is not heated in air above this temperature range during the calcination process or at any time before it is placed in service. Preferably, the temperature of the catalytic process for which the catalytic material is used does not exceed the calcination temperature. In any event, the thermal history of a platinum-containing catalytic product according to an optional embodiment of this invention will not include exposure to temperatures greater than 300° C. after the platinum is deposited thereon. Temperatures of 200° C. or less are permitted as long as calcination in the range between 200° C. to 300° C. is realized and not exceeded.

In various embodiments of the practice of the invention, suitable upper temperature limits to be optionally observed within the preferred calcination temperature range (i.e., temperatures not to be attained or exceeded) are 285° C., 275° C., 265° C. and 250° C. Suitable lower temperature limits optionally to be observed within the preferred calcination temperature range (i.e., temperatures to be exceeded during calcination) are 215° C., 225° C. and 235° C. This method aspect of the invention may be practiced in the preparation of any form of catalytic material comprising catalytic species dispersed on a support material, not just the catalytic materials specifically described herein.

Still another aspect of the invention relates to the discovery of optimum process conditions of temperature and flow rate that yield superior conversion rates for the primary object in the oxidation of CO without undue collateral oxidation of $H_2$. This aspect of the invention relates to temperature and flow rate of the feed stream through the catalyst member for improved oxidation of CO.

This invention also relates to the optional coating of the catalytic materials described herein onto carrier substrates that comprise an anchor layer as described herein for adhering the catalytic material to the carrier. In addition, this invention relates to the novel use of a catalyst member comprising a washcoat of catalytic material applied to flow-through monoliths, e.g., to honeycomb monoliths and/or foamed metal monoliths. The use of such monoliths provides greater mechanical stability to the catalytic material than the tablet or granule beds used in the prior art.

A catalytic material is prepared in accordance with one aspect of this invention by dispersing compounds and/or complexes of platinum and iron onto relatively inert support material. As used herein, the term "compound", as in "platinum compound" or "iron compound" means any compound, complex, or the like of platinum or iron which, upon calcination or upon use of the catalyst, decomposes or otherwise converts to a catalytically active form, which is often, but not necessarily, an oxide. The compounds or complexes may be dissolved or suspended in any liquid which will wet or impregnate the support material, and which is capable of being removed from the catalyst by volatilization or decomposition upon heating and/or the application of a vacuum. Generally, both from the point of view of economics and environmental aspects, aqueous solutions of soluble compounds or complexes are preferred. For example, suitable water-soluble platinum compounds are chloroplatinic acid and amine solubilized platinum hydroxide; suitable water-soluble iron compounds include $FeCl_2$, $FeCl_3$, $Fe_2(SO_4)_3$, $Fe(NO_3)_2$, $Fe(NO_3)_3$. The solution of catalytic species impregnated into the pores of the bulk support particles of the catalyst, i.e., the support particles are wetted with the solution, and the wetted or impregnated material is dried and calcined subject to the temperature limitations set forth herein, to remove the liquid and bind the platinum group metal and iron onto the support material. Wetting the support material with a platinum group metal solution and an iron solution may comprise wetting the support material with a solution containing both platinum and iron compounds or with separate solutions, one containing a platinum compound and one containing an iron compound. The wetted support is then dried and calcined and the dissolved platinum group metal and iron compounds are thus converted into catalytically active forms. An analogous approach can be taken to incorporate other components into the catalytic material. In particular embodiments, the solution contains bivalent platinum ions. For example, the solution may contain $Pt^{II}(NH_3)_4 Cl_2$ and may not be oxidized prior to calcination. The optional use of bivalent platinum ions and of a non-oxidized platinum solution both run contrary to the teaching of U.S. Pat. No. 5,583,087 (described above).

Suitable support materials for the catalytic component include alumina, silica, titania, silica-alumina, aluminosilicates, aluminum-zirconium oxide, aluminum-chromium oxide, etc. Such materials may be provided in various forms, but a support material is preferably used in a particulate, high surface area form. For example, gamma-alumina is preferred over alpha-alumina. The support material and therefore the resulting catalytic material are typically used in particulate form with particles in the micrometer-sized range, e.g., 10 to 20 micrometers in diameter, so that they can be formed into a slurry applied as a washcoat onto a carrier member.

The loading of platinum on a particulate support material should be in the range of from about 3 to 7 weight percent, preferably about 5 weight percent. The iron loading will be roughly proportional to the platinum loading at about six percent thereof, e.g., in the range of from about 0.1 to 0.6 weight percent, preferably about 0.3 weight percent.

Loadings of 3 to 5 weight percent platinum and 0.3 weight percent iron on powdered alumina correspond to the platinum and iron content in the surface layer of the prior art SELECTOXO™ catalysts described above. The overall loadings of 0.3 to 0.5 weight percent platinum and 0.03 weight percent iron stated above relative to the SELECTOXO™ catalysts reflect the fact that the SELECTOXO™ tablets contain within their interiors substantial quantities of alumina that are substantially free from catalytic species and which do not have significant contact with feed stream gases.

The interior mass of alumina reduces the overall loading of the catalytic species on the support material to about 0.3 to 0.5 weight percent platinum and about 0.03 weight percent iron. The loading of the catalytic species in the active layer of the tablets, however, is believed to be about 3 to 5 weight percent platinum and 0.3 weight percent iron.

In optional but preferred embodiments, catalytic material prepared in accordance with this invention is applied as a thin layer, e.g., as a washcoat, onto a carrier member of high surface area, which is believed to enhance contact between the gas stream and the catalytic species. A high surface area carrier member defines numerous apertures, pores, channels or similar structural features that cause liquid and/or gas to flow therethrough in turbulent or substantially non-laminar fashion and give the substrate a high surface area per overall volume of the flow path of the fluid through the substrate, e.g., features that create a high mass transfer zone for the fluid therein. Open substrates may be provided in a variety of forms and configurations, including honeycomb-type monoliths, woven or non-woven mesh, wadded fibers, foamed or otherwise reticulated or lattice-like three-dimensional structures, etc. For gas phase, i.e., fluid phase, reactions, a suitable carrier typically has a plurality of fluid-flow passages extending therethrough from one face of the carrier to another for fluid-flow therethrough. Optionally, a binder layer or etch coat may be applied to the carrier substrate before the catalytic material is coated onto the carrier. The etch coat, which may comprise a refractory inorganic oxide powder, helps the catalytic washcoat adhere to the carrier substrate and is particularly helpful in adhering the washcoat to a smooth metal surface. The etch coat may optionally comprise the same material used as the support material of a particulate catalytic material. An etch coat may not be needed, however, if the substrate surface is rough (e.g., if it is thermally sprayed onto the substrate as described below) or if it adheres well to the catalytic material. For example, an etch coat would be optional for use on a ceramic honeycomb monolith onto which a catalytic material comprising an alumina support material is to be applied, since the alumina is expected to adhere well to the ceramic material. Likewise, when the carrier comprises an aluminum metal substrate, the aluminum substrate may be calcined in air before the catalytic material is applied thereto, to produce on the surface a layer of alumina to which the catalytic material will adhere.

In one conventional carrier configuration that is commonly used for gas phase reactions and is known as a "honeycomb" monolith, the passages are typically essentially (but not necessarily) straight from an inlet face to an outlet face of the carrier and are defined by walls on which the catalytic material is coated so that the gases flowing through the passages contact the catalytic material. The flow passages of the carrier member may be thin-walled channels which can be of any suitable cross-sectional shape and size such as trapezoidal, rectangular, square, sinusoidal, hexagonal, oval, or circular. Such structures may contain from about 60 to about 1000 or more gas inlet openings ("cells") per square inch of cross section ("cpsi"), more typically 200 to 600 cpsi. Such a honeycomb-type carrier monolith may be constructed from metallic substrates in various ways such as, e.g., by placing a corrugated metal sheet on a flat metal sheet and winding the two sheets together about a mandrel. Alternatively, they may be made of any suitable refractory materials such as cordierite, cordierite-alpha-alumina, silicon nitride, zirconium mullite, spodumene, alumina-silica magnesia, zirconium silicate, sillimanite, magnesium silicates, zirconium oxide, petallite, alpha-alumina and alumino-silicates. Typically, such materials are extruded into a honeycomb configuration and then calcined, thus forming passages defined by smooth interior cell walls and a smooth outer surface or "skin".

Foamed metal may provide one species of open substrate for use in the present invention. Methods for making foamed metal are known in the art, as evidenced by U.S. Pat. No. 3,111,396, discussed above, and the use of foamed metal as a carrier for a catalytic material has been suggested in the art, as recognized above by reference to SAE Technical Paper 971032 (cited above) and to the journal article by Pestryakov et al (cited above). Briefly described, a foamed metal substrate can be formed by a casting process in which a mold is filled with a mixture of metal powder and granules of an expendable, removable material. The sleeve and the metal powder-removable granules mixture therein are sintered. The metal powder forms a porous matrix about the removable granules, which are burned away. The resulting foamed metal substrate is then removed from the mold for finishing. Foamed metal can be characterized in various ways, some of which relate to the properties of the initial organic matrix about which the metal is disposed. Some characteristics of foamed metal substrates recognized in the art include cell size, density, free volume, and specific surface area. For example, the surface area may be 1500 times that of a solid substrate having the same dimensions as the foamed substrate. As mentioned by Pestryakov et al, foamed metal substrates useful as carriers for catalyst members may have mean cell diameters in the range of 0.5 to 5 mm, and they may have a free volume of from about 80 to 98%, e.g., 3 to 15 percent of the volume occupied by the foamed substrate may constitute metal. The porosity of the substrate may range from 3 to 80 ppi, e.g., from 3 to 30 ppi or from 3 to 10 ppi or, alternatively, from 10 to 80 ppi. In the illustrative range of 10 to 80 ppi, other characteristics such as cells per square inch may range from 100 to 6400 and the approximate web diameter may vary from 0.01 inch to 0.004 inch. Such foams may have open-cell reticulated structures, based on a reticulated/interconnected web precursor. They typically have surface areas that increase with porosity in the range of from about 700 square meters per cubic foot of foam ($m^2/ft^3$) at about 10 ppi to 4000 $m^2/ft^3$ at about 60 ppi, etc. Other suitable foamed metal substrates have surface areas ranging from about 200 square feet per cubic foot of foamed metal ($ft^2/ft^3$) at about 10 ppi to about 1900 $ft^2/ft^3$ at about 80 ppi. One such substrate has a specific weight of 500 $g/m^2$ at a thickness of about 1.6+/−0.2 millimeters with a porosity of 110 ppi. They may have volume densities in the range of 0.1 to 0.3 grams per cubic centimeter (g/cc). Foamed metal sheets can be rolled, layered, etc., to build up a substrate of any desired dimension. Suitable foamed nickel with which the present invention may be practiced is commercially available in extruded sheets about 1.6 millimeters (mm) thick. It may have tensile strengths of at least 3 kilograms per square centimeter ($kg/cm^2$) in the machine direction and 9 percent in the transverse direction. At thicknesses of 1.3 to 2.5 mm, it may have specific weights in the range of 350 to 1000 $g/m^2$ and a pore size of 60 to 110 pores per lineal inch (ppi). One particular material has a specific weight of 500 $g/m^2$ and 80 ppi.

One suitable foamed metal substrate for use with the present invention had a density of about 6 percent. Foamed metal substrates can be formed from a variety of metals, including iron, titanium, tantalum, tungsten noble metals, common sinterable metals such as copper, nickel, bronze, etc., aluminum, zirconium, etc., and combinations and alloys thereof such as steel, stainless steel, Hastalloy, Ni/Cr, Inconel (nickel/chromium/iron) and Monel (nickel/copper).

Stainless steel foam is a good, low-cost alternative to plate-like substrates and to more expensive alloy foams such as Fecralloy (FeCrAl).

Pestryakov et al state that the specific surface area for pure foam metals equals approximately 0.01 to 0.1 $m^2/g$, but that this is insufficient to produce active catalysts for a majority of catalytic processes taking place in the kinetic region. They therefore recommend increasing the specific surface area by direct deposition on the foamed metal of gamma-alumina having a surface area of 20 to 50 $m^2/g$, although they state that low surface area foamed metals may be used in high temperature external diffusion processes. The present invention teaches instead the thermal spraying such as electric arc spraying of a metal anchor layer preferably comprising nickel aluminide onto the metal foam substrate.

Another species of open substrate may be provided by woven or non-woven wire mesh. A woven wire mesh substrate for use with the present invention may be formed in any suitable weave, e.g., plain, twill, plain Dutch weave, twill Dutch weave, crocheting, etc. Wire mesh is commonly available in weaves that leave from about 18 to 78 percent open area, more typically, from about 30 to 70 percent open area. "Open area" is known in the art as a measure of total mesh area that is open space. Mesh counts (the number of openings in a lineal inch) for such materials vary from two per inch by two per inch (2×2) to 635×635. The mesh may be woven from wires comprising aluminum, brass, bronze, copper, nickel, stainless steel, titanium, etc., and combinations and alloys thereof. A non-woven wire mesh that can be used as an open substrate in accordance with this invention may be made from the same materials as woven mesh. A wire mesh substrate may comprise one or more layers of wire mesh joined together by soldering, welding or any other suitable method.

Any metal substrate used as a carrier monolith in the practice of the present invention may optionally be pre-coated with a binder layer of alumina or another refractory inorganic oxide before the catalytic material is deposited thereon. As an alternative to the binder layer, or optionally in addition thereto, the metal monolith may be calcined in air to produce a surface layer of metal oxide before the catalytic material is deposited thereon. Employing a binder layer and pre-calcining the metal substrate both help to improve the adherence of the catalytic material to the monolith.

The use of catalyst members that comprise catalytic material deposited upon carrier monoliths with such high cell or pore densities as described above allows the use of smaller catalyst members or beds than was previously practicable. In other words, less physical space or volume is needed for a high cell or high pore density catalyst member than was needed for a granular or tableted catalyst bed that achieves the same degree of catalytic activity.

Methods for applying a catalytic washcoat onto carrier substrates, including both open substrates and dense substrates, are well-known in the art.

When catalytic species are deposited onto a carrier, especially onto an open substrate, the amounts of the catalytic species and other components of the catalytic material are often presented based on grams per volume basis, e.g., grams per cubic foot ($g/ft^3$) for platinum group metal components and grams per cubic inch ($g/in^3$) for support material and for the catalytic material as a whole, as these measures accommodate different gas-flow passage configurations in different carriers. In typical embodiments, the loading of catalytic material on a flow-through open carrier substrate for use according to the present invention may be in the range of from about 1 to 3 $g/in^3$ of the catalytic material with the platinum and iron components therein according to their relative weight percents as described above. The finished catalyst member may be mounted in a metallic canister that defines a gas inlet and a gas outlet and that facilitates flow of the feedstream into contact with the catalyst.

In contrast to an open substrate, a dense substrate (or low surface area substrate), such as a plate, tube, foil and the like, on which the catalytic material of the invention may be deposited as well, has a relatively small surface area per overall volume of the flow path through the substrate regardless of whether it is perforated or not, and do not substantially disrupt laminar flow therethrough.

Another broad aspect of this invention pertains to the preparation of a carrier for catalytic material by the thermal spraying of a metal anchor layer onto any type of substrate. Catalytic material may then be deposited on the carrier. In particular, this broad aspect of the present invention pertains to thermal spraying processes in general, including plasma spraying, single wire plasma spraying, high velocity oxy-fuel spraying, combustion wire and/or powder spraying, electric arc spraying, etc., which have not previously been utilized for depositing anchor layers onto open substrates. One reason that thermal spraying has not been used in open substrates is the belief that to obtain good results it is necessary that substantially all of the surface area of a substrate to be sprayed had to be accessible in a line of "sight" from the spray head and that open substrates have so much surface area that is not accessible in this way, i.e., that open substrates have such a high degree of surface area that is obscured relative to a line of sight from a spray head, that satisfactory spraying could not be achieved. The present invention reveals, however, that open substrates can in fact be satisfactorily coated using thermal spray methods.

Still another aspect of the present invention arises from a discovery that electric arc spraying, e.g., twin wire arc spraying, of a metal (which term, as used herein and in the claims, includes mixtures of metals, including without limitation, metal alloys, pseudoalloys, and other intermetallic combinations) onto a metal or ceramic substrate yields a structure having unexpectedly superior utility as a carrier for catalytic materials in the field of catalyst members, regardless of whether the substrate is an open substrate or a dense substrate. Twin wire arc spraying (encompassed herein by the term "wire arc spraying" and by the broader term "electric arc spraying") is a known process, as indicated by the above reference to U.S. Pat. No. 4,027,367 which is incorporated herein by reference. Briefly described, in the twin wire arc spray process, two feedstock wires act as two consumable electrodes. These wires are insulated from each other as they are fed to the spray nozzle of a spray gun in a fashion similar to wire flame guns. The wires meet in the center of a gas stream generated in the nozzle. An electric arc is initiated between the wires, and the current flowing through the wires causes their tips to melt. A compressed atomizing gas, usually air, is directed through the nozzle and across the arc zone, shearing off the molten droplets to form a spray that is propelled onto the substrate. Only metal wire feedstock can be used in an arc spray system because the feedstock must be conductive. The high particle temperatures created by the spray gun produce minute weld zones at the impact point on a metallic substrate. As a result, such electric arc spray coatings (sometimes referred to herein as "anchor layers") have good cohesive strength and a very good adhesive bond to the substrate.

The principal operating parameters in wire arc spraying include the voltage and amperage for the arc, the compression of the atomizing gas, the nozzle configuration and the stand-off from the substrate. The voltage is generally in the range of from 18 to 40 volts, and is typically in the range of from 28 to 32 volts; the current may be in the range of from about 100 to 400 amps. The atomizing gas may be compressed to a pressure in the range of from about 30 to 70 psi. The nozzle configuration (e.g., slot aperture or cross aperture) and spray pattern vary in accordance with the desired nature of the anchor layer or may be chosen to accommodate the other parameters or the character of the substrate. A suitable stand-off is generally in the range of from about 4 to 10 inches from the substrate to the nozzle. Another operating parameter is the spray rate for the feedstock, a typical example of which would be 100 pounds per hour per 100 amps (4.5 kg/hr/100 amps). Still another parameter is the coverage or feedstock consumption rate, which may be, to give a particular example, 0.9 ounce per square foot per 0.001 inch thickness of the anchor layer. (It is typical to have a deposition efficiency of 70 percent (e.g., for spraying a plate) or less.)

Electric arc spray coatings are usually harder to finish (e.g., to grind down) and normally have higher spray rates than coatings of other thermal spray processes. Dissimilar electrode wires can be used to create an anchor layer containing a mixture of two or more different metal materials, referred to as a "pseudoalloy". Optionally, reactive gases can be used to atomize the molten feedstock to effect changes in the composition or properties of the applied anchor layer. On the other hand, it may be advantageous to employ an inert gas or at least a gas that does not contain oxygen or another oxidizing species. Oxygen, for example, may cause oxidation on the surface of a metal substrate or in the feedstock material and thus weaken the bond between the anchor layer and the substrate.

Anchor layers of a variety of compositions can be deposited on a substrate in accordance with the present invention by utilizing, without limitation, feedstocks of the following metals and metal mixtures: Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels, and, optionally, mixtures of two or more thereof. One specific example of a metal useful for wire arc spraying onto a substrate in accordance with the present invention is a nickel/aluminum alloy that generally contains at least about 90% nickel and from about 3% to 10% aluminum, preferably from about 4% to 6% aluminum by weight. Such an alloy may contain minor proportions of other metals referred to herein as "impurities" totaling not more than about 2% of the alloy. A preferred specific feedstock alloy comprises about 95% nickel and 5% aluminum and may have a melting point of about 2642° F. Some such impurities may be included in the alloy for various purposes, e.g., as processing aids to facilitate the wire arc spraying process or the formation of the anchor layer, or to provide the anchor layer with favorable properties.

One aspect of the present invention derives from the discovery that electric arc spraying a metal onto a metal substrate yields an unexpectedly superior carrier for catalytic materials relative to carriers having metal anchor layers applied thereto by other methods. Catalytic materials have been seen to adhere better to a carrier comprising an electric arc sprayed anchor layer than to a carrier comprising a substrate without an intermediate layer applied thereto and even better than to a carrier comprising a substrate having a metal layer deposited thereon by plasma spraying. Before the present invention, catalytic materials disposed on metal substrates, with or without intermediate layers between the substrate and the catalytic material, often did not adhere sufficiently well to the substrate to provide a commercially acceptable product. For example, a metal substrate having a metal intermediate layer that was plasma-sprayed thereon and having a catalytic material applied to the intermediate layer failed to retain the catalytic material, which flaked off upon routine handling, apparently due to a failure of the intermediate layer to bond with the substrate. The catalytic material on other carriers was seen to spall off upon normal use as automotive environmental catalysts, apparently as a result of being subjected to a high gas flow rate, to thermal cycling, to the eroding contact of high temperature steam and other components of the exhaust gas stream, vibrations, etc. The present invention therefore improves the durability of catalyst members comprising catalytic materials carried on carrier substrates by improving their durability. It also permits the use of such catalyst members in positions upstream from sensitive equipment that would be damaged by catalytic material and/or anchor layer material that spall off prior art catalyst members.

Surprisingly, the Applicants have discovered that electric arc spraying (of which wire arc spraying is a particular embodiment) of a metal onto a metal substrate results in a superior bond between the resulting anchor layer and the substrate relative to plasma spraying. An electric arc sprayed anchor layer is believed to have at least two characteristics that distinguish it from anchor layers applied by plasma spraying: a superior anchor layer-metallic substrate interface bond and a highly irregular or "rough" surface. It is believed that the anchor layer-metallic substrate interface bond may be the result of diffusion between the sprayed material and the metallic substrate that is achieved at their interface despite the relatively low temperature at which wire arc spraying is practiced. For example, the electric arc temperature may be not more than 10,000° F. In such case, the temperature of the molten feedstock is expected to be at a temperature of not more than about 5000° F., preferably in the range of 1000° to 4000° F., more preferably not more than about 2000° F. The low temperature is also believed to be responsible for the especially uneven surface of the anchor layer because the sprayed material cools on the substrate (whether metal or ceramic) to its freezing temperature so quickly that it does not flow significantly on the substrate surface and therefore does not smooth out. Instead, it freezes into an irregular surface configuration. Accordingly, the surface of the anchor layer has a rough profile that provides a superior physical anchor for catalytic components and materials disposed thereon. The rough profile appears to be the result of "pillaring", the formation of small, pillar-like structures resulting from the sequential deposition and freezing of one molten drop of feedstock material atop another.

An electric arc spray process can be used to produce an anchor layer on a variety of substrates that may vary by their composition and/or by their physical configuration. For example, the substrate may be an open substrate or a dense substrate; it may be in the form of a metal plate, tube, foil, wire, wire mesh, rigid or malleable foamed metal, etc., ceramic structures, or a combination of two or more thereof. It does not appear to be important to match the sprayed metal to the metal of the substrate.

Figure 2B:
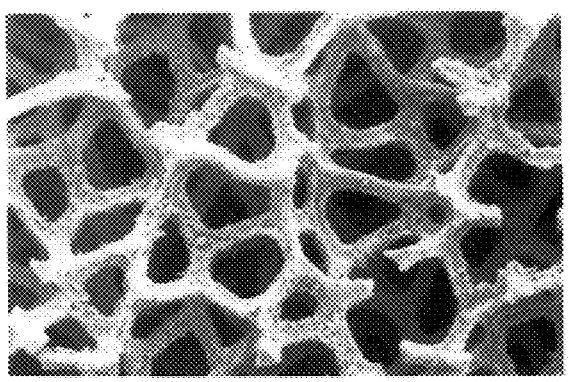
FIGS. 2A–2D are photomicrographs of a foamed metal substrate having an anchor layer electric arc sprayed thereon, at magnifications of 38×, 55×, 153× and 434×, respectively.
Figure 2A:
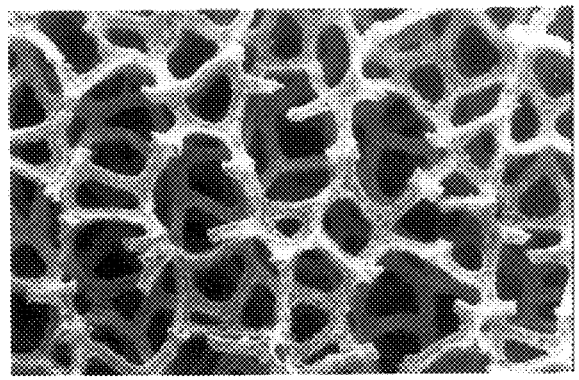
Figure 2D:
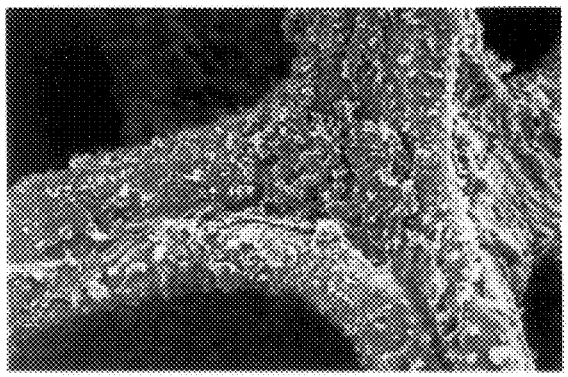
Figure 2C:
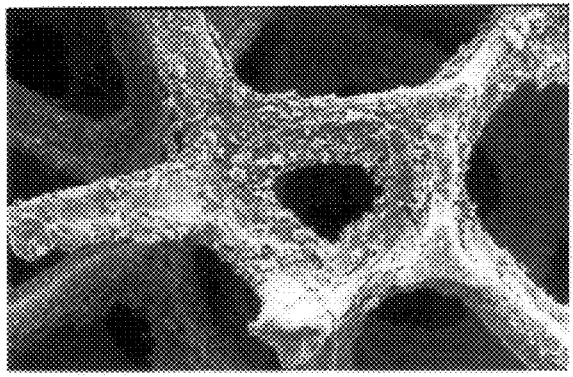
Figure 2E:
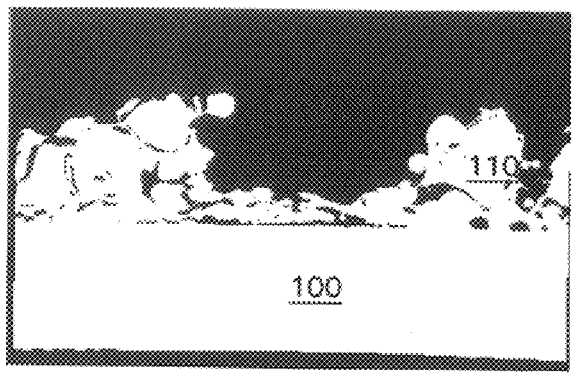
FIGS. 2E–2G are photomicrographs of a cross section of a flat metal substrate and an anchor layer electric arc sprayed thereon, at magnifications of 500×, 1.51 k× and 2.98 k×.
Figure 2F:
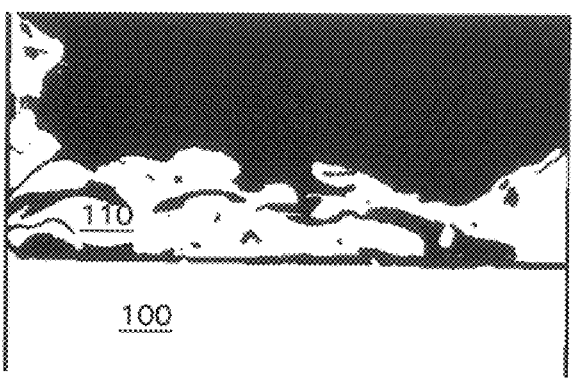
Figure 2G:

To illustrate the dramatic difference in the surface of an anchor layer applied in accordance with the present invention as compared to the surface of a metal substrate without the anchor layer, reference is made herein to FIGS. 1A through 1D and, for comparison thereto, FIGS. 2A through 2D. FIGS. 1A through 1D are photomicrographs of a foamed metal substrate, taken at a variety of magnification levels. These Figures show that the substrate has a three-dimensional web-like structure having smooth surfaces. By comparison, FIGS. 2A through 2D are photomicrographs of a foamed metal substrate taken at corresponding magnification levels after an anchor layer has been electric arc sprayed thereon. A visual comparison of FIGS. 1A through 1D and the corresponding FIGS. 2A through 2D illustrates the roughened surface that results from electric arc spraying an anchor layer onto a substrate as taught herein. FIGS. 2E, 2F and 2G show sections of a high temperature steel plate substrate 100 and a nickel aluminide anchor layer 110 electric arc sprayed thereon, at magnifications of 500×, 1.5 k× and 2.98 k×, respectively. As is evident from these Figures, the anchor layer 110 provides a highly irregular surface on the substrate 100. Accordingly, the anchor layer 110 effectively increases the surface area on which catalytic material may be deposited on the carrier relative to a non-sprayed substrate and it provides structural features such as crevices, nooks, etc., that help prevent spalling of catalytic material from the anchor layer. FIGS. 2E through 2G illustrate that the relatively low temperature of the electric arc spray process deposits the metal feedstock for the anchor layer on the substrate at a temperature that permits the feedstock to freeze when it impinges upon the substrate rather than remaining molten and flowing into a smoother configuration.

Figure 2H:
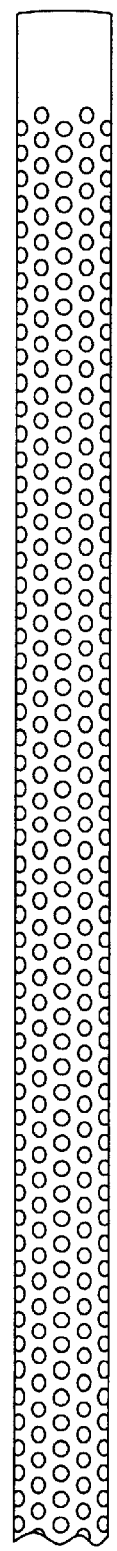
FIG. 2H is an elevation view of a perforated, tubular metal substrate.
Figure 2I:
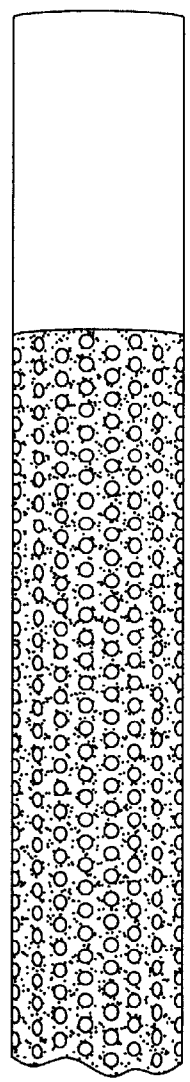
FIG. 2I is an elevation view of a catalyst member in accordance with the present invention comprising the substrate of FIG. 2H.

In another example of the practice of the present invention, a perforated stainless steel tube substrate as shown in FIG. 2H was electric arc sprayed with a nickel aluminide feedstock to deposit an anchor layer thereon; a catalytic material can then be deposited on the anchor layer. A sample of a resulting catalyst member is shown in FIG. 21. The anchor layer will provide superior adhesion of a catalytic material to the carrier when it is used to prepare a catalyst member in accordance with the present invention. In an alternative embodiment, a non-perforated tubular substrate may be wire arc sprayed and coated with catalytic material. Such tubular catalyst members may be assembled into a heat exchange device for catalytically treating and exchanging heat with a gas stream. Optionally, a flow-through catalyst member may be mounted within the tubular catalyst member.

Figure 2J:
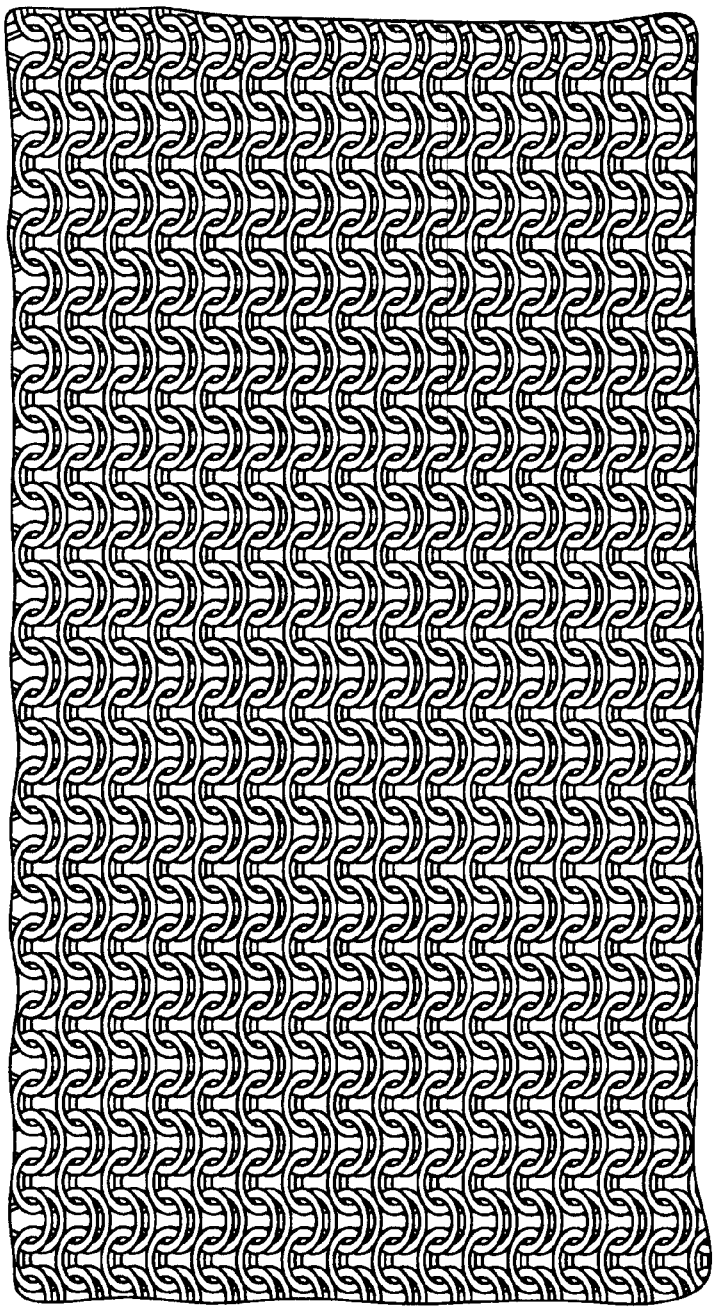
FIG. 2J is a schematic view of a wire mesh substrate having an anchor layer sprayed thereon in accordance with the present invention.

The strong bond of an anchor layer achieved by electric arc spraying permits the resulting substrates to be mechanically processed in various ways that reshape the substrate but that do not diminish the mass of the substrate, i.e., they do not involve cutting, grinding or other removal of substrate material. For example, pliable (i.e., malleable and/or flexible) anchor layer-coated substrates may be bent, compressed, folded, rolled, woven, etc., after the anchor layer is deposited thereon, in addition to or instead of being cut, ground, etc. As used herein and in the claims, the term "reshape" is meant to encompass all such processes that deform the substrate but do not reduce its mass by cutting, grinding, etc. Thus, a wire arc-sprayed foil substrate can be reshaped by being corrugated and rolled with a flat foil to provide a corrugated foil honeycomb. A wire can be reshaped by being sprayed and then woven with other wires to compose a mesh that is used as a carrier for a catalytic material. Similarly, a flat wire mesh substrate that has been wire arc sprayed in accordance with this invention can then be reshaped by being curled into a cylindrical configuration or by being formed into a corrugated sheet that may optionally be combined with other substrates to compose a carrier, or that may be used on its own. A plural-layer wire mesh substrate with an anchor layer thereon that can optionally be reshaped in these ways is shown in FIG. 2J. Likewise, foamed metal having an anchor layer thereon may be reshaped by being compressed to change its shape and/or density as discussed herein. Such reshaping may occur before or even after catalytic material is deposited on the foamed metal substrate. The present invention permits the manufacture of carriers and/or catalyst members that can easily be molded to fit within a container for the catalyst member, e.g., in a canister specifically designed to house a catalyst member, or in another portion of the apparatus, e.g., in a gas stream flow pipe, a high mass transfer area conduit, etc. For example, a flat, catalyzed wire mesh patch prepared in accordance with the spraying and coating methods described herein may be reshaped for installation in a pipe by being rolled into a coiled configuration. Optionally, the substrate may be resilient and may, upon insertion into a containing structure, be allowed to unwind or otherwise relax from the reshaping force to the extent that it bears against the interior surface of the containing structure, thus conforming to the structure.

Figure 3A:
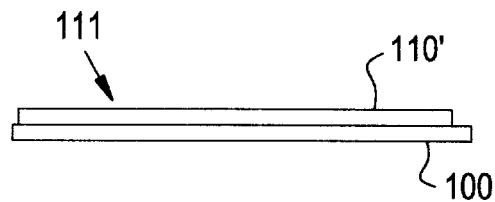
FIG. 3A is a schematic cross-sectional view of a metal substrate having an anchor layer electric arc sprayed thereon according to one embodiment of the present invention.
Figure 3B:
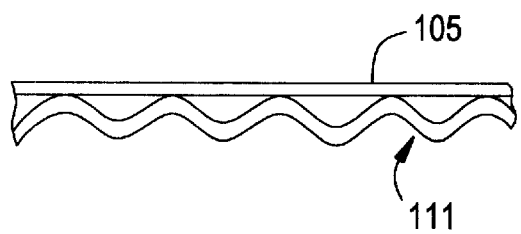
FIG. 3B is a schematic cross-sectional view of the substrate of FIG. 3A after processing into a corrugated configuration and being disposed upon another sprayed substrate.
Figure 3C:
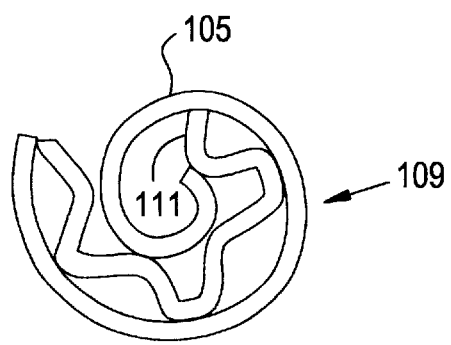
FIG. 3C is a schematic cross-sectional view of the substrates of FIG. 1B after further processing to wind the substrates to form a honeycomb.
Figure 3D:
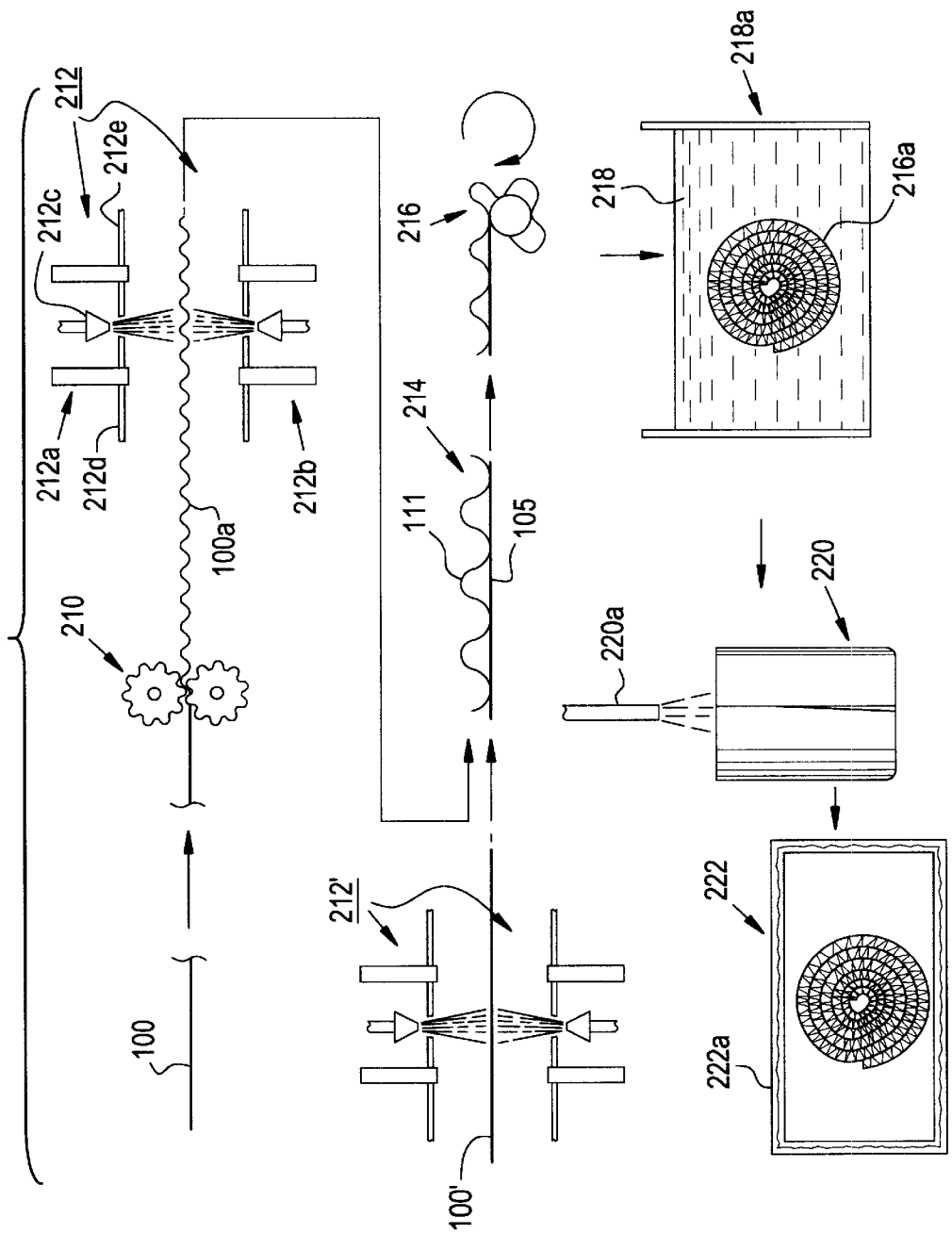
FIG. 3D is a schematic process diagram illustrating the manufacture of a catalyst member according to a particular embodiment of the present invention.

One example of a substrate that has been reshaped after having an anchor layer deposited thereon is seen in FIG. 3A, which shows a metal substrate 100 that has been wire arc sprayed to deposit an anchor layer 110' thereon. The sprayed substrate 111 may then be corrugated and placed against a second, optionally sprayed substrate 105, as shown in FIG. 3B. The two substrates may be further processed by coiling them together as shown FIG. 3C to compose a carrier 109 for catalytic material to be deposited thereon. A process for producing a catalyst member from such a carrier is shown in schematically in FIG. 3D, beginning with a flat metal foil substrate 100 which is passed through a corrugation station 210 to produce a corrugated foil substrate 100a. The corrugated substrate 100a is passed through an electric arc spraying station 212 comprising two electric arc spraying apparatuses 212a, 212b, one for spraying each side of substrate 100a. Each apparatus comprises a pair of electrified feedstock wires 212d and 212e which may comprise a nickel aluminide alloy or other metal, and a spray gun 212c for atomizing the molten metal formed by the electric charge passing between the electrode wires. The spray gun sprays the molten metal feedstock onto the substrate. Separately, a flat substrate 100' has an anchor layer electric arc sprayed on both sides thereof in station 212'. The corrugated, electric arc sprayed substrate 111 is disposed upon the flat electric arc sprayed substrate 105 in step 214, and the two substrates are wound (reshaped) and then secured together in step 216 to produce a metallic honeycomb carrier in a manner generally known in the art. At coating station 218, the carrier 216a is dipped in a bath 218a comprising a slurry of catalytic material. In step 220, an air knife 220a is used to blow excess catalytic material from the carrier. In a fixing step 222, the coated carrier is placed in an oven 222a where it is dried and optionally but preferably calcined preferably at temperatures in the range of 200° C. to 300° C. and not higher, to remove the liquid portion of the slurry and to bind the catalytic material onto the carrier, thus producing a catalyst member comprising catalytic material deposited upon an electric arc sprayed carrier substrate. The catalyst member may be incorporated into a fuel cell system by being mounted in a body or canister for placement in the fuel cell feed stream.

Metallic honeycomb carriers may be made according to a method that makes use of a corrugated foil strip having opposite side edges and corrugations oriented at an oblique angle to the side edges. The foil strip is folded on lines perpendicular to the side edges to provide a core body having fluid passages between opposite ends and a shaped periphery defined by parallel outside folds in the corrugated strip. The core body thus formed is inserted into a jacket tube so that folds at the core body periphery are in compressive contact with the jacket tube, and the periphery of the core body is joined to the jacket tube. The method for producing such carriers and the carrier resulting therefrom are described in detail in abandoned U.S. patent application Ser. No. 08/728,641 filed Oct. 10, 1996, the disclosure of which is incorporated herein by reference. Briefly restated, a preferred honeycomb carrier core body may be formed from a corrugated foil strip in which corrugations are oriented at an oblique angle to side edges of the strip. An embodiment of such a foil strip is shown as a substrate in FIGS. 3E and 3F of the drawings and generally designated by the reference numeral 110.

The illustrated strip 110 is initially of an undefined or continuous length and has opposite side edges 112 and 114 to establish a strip width W which may be between 1 and 9 inches, depending on the size of the core body to be formed. The strip 110 is "skew corrugated", that is, the corrugations 116 extend on linear paths between the side edges 112 and 114, and are inclined at an oblique angle β with respect to the side edges. Ideally, the angle β is the same for all corrugations and is preferably in a range of from 40 to 15°. In practice, the oblique angle of individual corrugations may vary relative to others of the corrugations, although the angles β for all corrugations will fall within the preferred range.

In FIG. 3F, the side profile of the foil strip 110 is shown at an enlarged scale to reveal an exemplary shape and relative dimensions of the corrugations 116. As shown, each corrugation 116 has a height h and pitch length 1. The thickness of the foil material from which the strip 110 is formed is designated by t.

In some applications, corrugations preferably have a height h of from about 0.01 inch to about 0.15 inch, and a pitch length 1 of from about 0.02 inch to about 0.25 inch. The height and pitch length of the corrugations determine cell density, that is, the number of cells per unit of cross-sectional area in the converter body, in accordance with equation (1):

$$c = \cos \beta / h \, 1 \qquad (1)$$

Typically, the cell density c is expressed in cells per square inch (cpsi) and, in some applications, may vary from about 50 cpsi to 1000 cpsi.

The foil strip 110 may be constructed from "ferritic" stainless steel such as that described in U.S. Pat. No. 4,414,023 to Aggen. One usable ferritic stainless steel alloy contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trade designation "ALFA-IV®".

Another usable commercially available stainless steel metal alloy is identified as Haynes 214 alloy. This alloy and other useful nickeliferous alloys are described in U.S. Pat. No. 4,671,931 to Herchenroeder et al. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Still another suitable alloy is Haynes 230 alloy, which contains 22% chromium, 14% tungsten, 2% molybdenum, 0.10% carbon, a trace amount of lanthanum, balance nickel.

The ferritic stainless steels and the Haynes alloys 214 and 230, all of which are considered to be stainless steels, are examples of high temperature resistive, oxidation resistant (or corrosion resistant) metal alloys that are useful for use in making the foil strip and core body sheet elements of the present invention, as well as the multicellular honeycomb converter bodies thereof. Suitable metal alloys must be able to withstand "high" temperature, e.g., from 900° C. to 1200° C. (1652° F. to 2012° F.) over prolonged periods.

Other high temperature resistive, oxidation resistant metal alloys are known and may be used as well. For most applications, and particularly automotive applications, these alloys are used as "thin" metal or foil, that is, having a thickness of from about 0.001 inch to about 0.005 inch, and, preferably, from 0.0015 inch to about 0.0037 inch.

In accordance with this aspect of the present invention, the skew corrugated foil strip is folded on lines perpendicular to the side edges thereof to provide a core body with a shaped periphery defined principally by parallel outside folds in the corrugated strip. In particular, the foil strip is reverse-folded in accordion fashion on fold lines spaced at intervals selected to generate the desired peripheral shape of the core body. The overlying adjacent segments of the strip between the folds provide fluid passages between the ends of the core body.

In FIG. 3E, exemplary parallel fold lines are designated by the reference numerals 118, 119, 120, 121 and 122. These fold lines are also shown to be spaced at increasing intervals, from right to left in FIG. 3E, to generate part of a core body 125 having a circular periphery as shown in FIG. 3G. Although the spacing of fold lines in FIG. 3E is not precise and representative only, given the height h of corrugations in the strip 110, folding that strip to generate the circular periphery shown in FIG. 3G is easily accomplished using known algorithms and computer controlled folding apparatus, for example. As a result of the folding operation, adjacent chord-like segments of the strip 110 extend between pairs of outside folds 128 located at the core periphery 126. Also, the corrugations 116 of adjacent strip segments cross each other in non-nesting relation to provide a network of fluid passages between the ends of the core body 125.

The crossings of corrugations establish contact points between adjacent strip segments, and serve to provide support for the individual foil segments or layers in a direction perpendicular to the chords on which they lie. The number of contact points between each strip segment or layer in the core body 125, therefore, represents a parameter contributing to strength and durability of the core body 125 in the completed honeycomb carrier body in which it is used. It is preferred that each corrugation in one strip segment or layer cross with corrugations in an adjacent layer at least 6 contact points, more preferably, 8 contact points. The number of contact points Np is dependent on the width W of the strip 110, the angle β of the skewed corrugations, and the pitch length 1 of the corrugations in equation (2):

$$Np = 2W \sin \beta / 1 \qquad (2)$$

After the core body is folded and assembled to the configuration shown in FIG. 3G, for example, it is temporarily secured such as by tying a string or placing a rubber band or other ligature about the periphery thereof The periphery 126 of the core body 125, particularly the outside folds 128, are cleaned to reveal a clean metallic surface at each of the outside folds 128. All coating materials applied to the strip 110 are removed by the cleaning from at least the outside folds 128. The cleaning may be accomplished, for example, by grit blasting the surfaces on the periphery of the core body 125, using aluminum oxide particles in a high velocity stream of compressed air. Silicon carbide grit also may be used. Other cleaning methods may be used to remove coating and other foreign materials from the periphery of the folded core body 125. For example, the periphery of the core body may be scraped or abraded with an assortment of well-known tools, such as files, abrasive stones, wire wheels and the like. Also, it is within the scope of the invention to provide a clean metal surface at the folds by masking the fold lines prior to coating.

After assembly and cleaning as described, the folded core body is inserted into a jacket tube so that folds at the core body periphery are in contact, preferably under compression, with the interior of the jacket tube, and the periphery of the core body is joined to the jacket tube.

In the illustrated embodiment and as depicted in FIG. 3H, the core body 125 is inserted axially into a jacket tube 130 of cylindrical configuration to complement the exterior shape of the core body 125. The jacket tube 130 has an interior surface 132 and is formed preferably of stainless steel having a thickness of from about 0.03 inch to about 0.08 inch, preferably 0.04 inch to 0.06 inch. Prior to insertion, the interior surface 132 of the jacket tube 130 is coated with a brazing alloy such as AMDRY Alloy 770, 0.002 inch in thickness. Alternatively, and as illustrated in FIG. 3H, the core body 125 may be wrapped in a brazing foil 134 as a way of providing a layer of brazing alloy between the outer periphery 126 of the core body 125 and the interior surface 132 of the jacket tube 130.

It is important that a sufficient number of the outside folds 128 at the periphery 126 of the core body 125 be in contact with the interior surface 132 of the jacket tube 130 to ensure a secure joining of the folds 128 to the interior surface 132 of the jacket. Such contact is preferably achieved by compressing the core body 125 to reduce its diameter approximately one to three percent. The reason for this compression and accompanied reduction in diameter of the core body 125 may be appreciated from the illustrations in FIGS. 3I and 3J of the drawings.

Figure 3I:
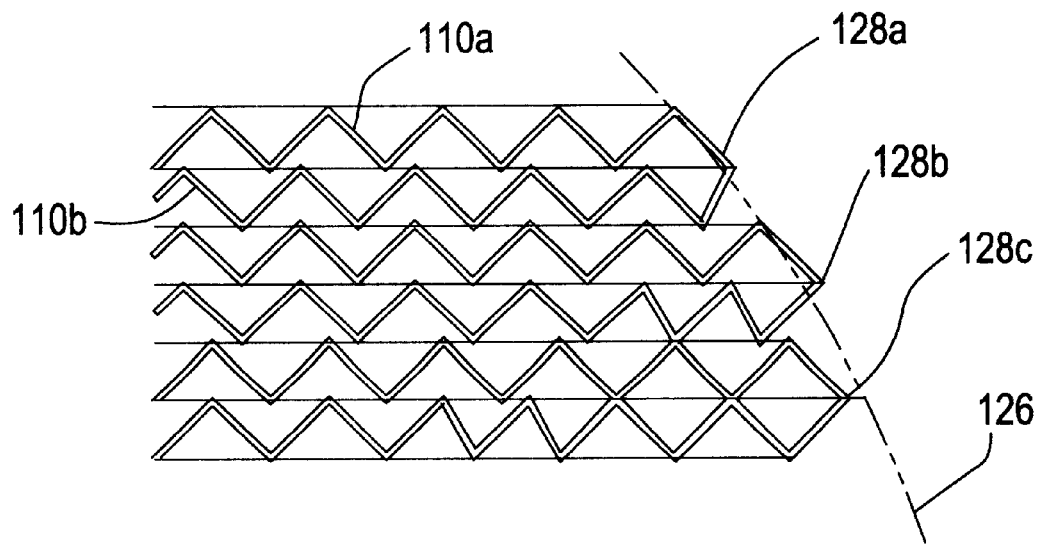
FIG. 3I is an enlarged fragmentary end view of the core body shown in FIG. 3G.
Figure 3J:
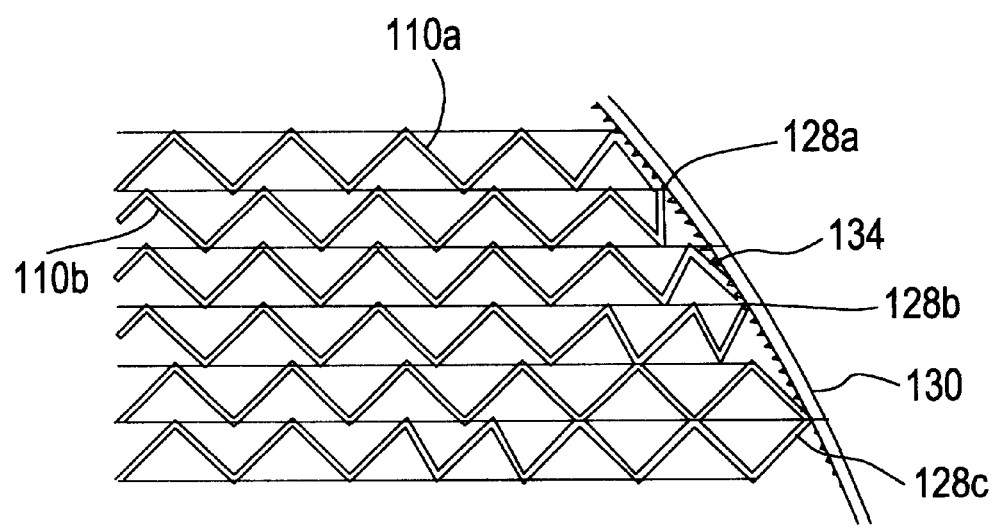
FIG. 3J is an enlarged fragmentary end view, similar to FIG. 3I, but illustrating the core body and jacket after assembly.

As shown in FIG. 3I, adjacent layers or segments of the corrugated strip, designated 110a and 110b, are joined at the intended periphery 126 by fold lines 128a, 128b and 128c. Because of imperfections in the folding of the foil strip 110 with presently known folding equipment, it is not possible for the folds 128 to lie precisely on the intended periphery 126 of the core body 125. Thus, and as shown in FIG. 3I, the fold 128a lies outside of the intended periphery 126, the fold 128b lies outside the intended periphery 126 and the fold 128c lies within the intended periphery 126. As shown in FIG. 3J, after the core body 125 is inserted into the jacket 130 and is placed under compression against the inner surface 133 on which the brazing alloy 134 is located, the folds 128a and 128b are compressed to be strained or deformed inwardly so that all three folds firmly contact the brazing alloy 134. It should be understood that illustration in FIGS. 3I and 3J is for purposes of explanation only and that in practice, the respective folds 128 at the periphery of the core body, as folded, will deviate randomly from the intended periphery or that which complements the inner surface 132 of the jacket tube 130.

Figure 3K:
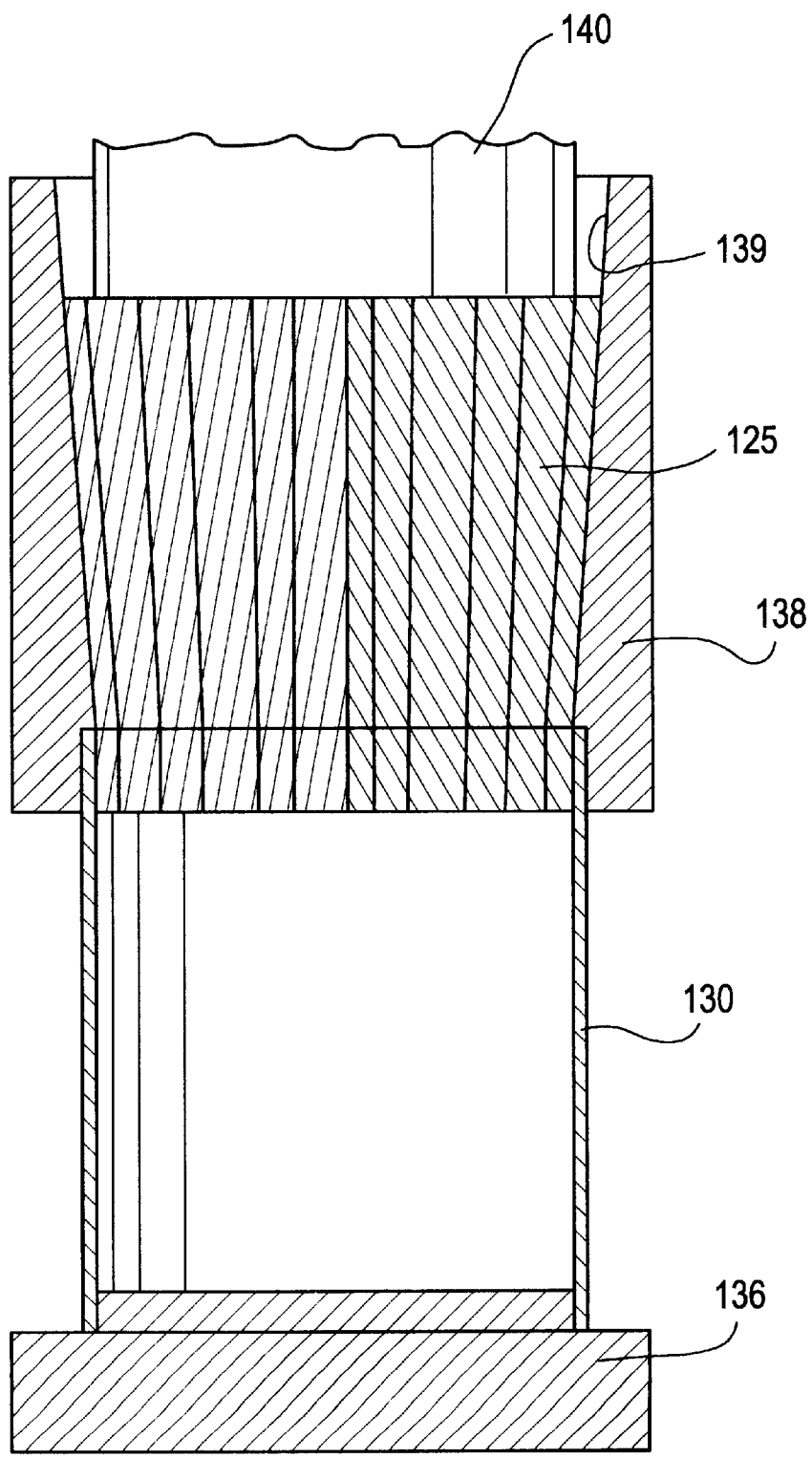
FIG. 3K is a fragmentary cross section illustrating a preferred way of inserting the core body of the invention into a jacket tube.

A preferred way of inserting the core body 125 into the jacket tube 130 is depicted in FIG. 3K. As shown, the jacket tube 130 is mounted on a pedestal 136 and fitted at its upper end with an annular tapered die 138 having a frustoconical inner surface 139 which converges downwardly to an inside diameter equal to the inside diameter of the jacket tube 130. A ram 140 is used to force the core body 125 through the tapered inner surface 139 of the die 138 so that as the core body enters the jacket tube 125 it is compressed to reduce the diameter of the core body periphery 126 by the approximately one to three percent indicated above.

Figure 3L:
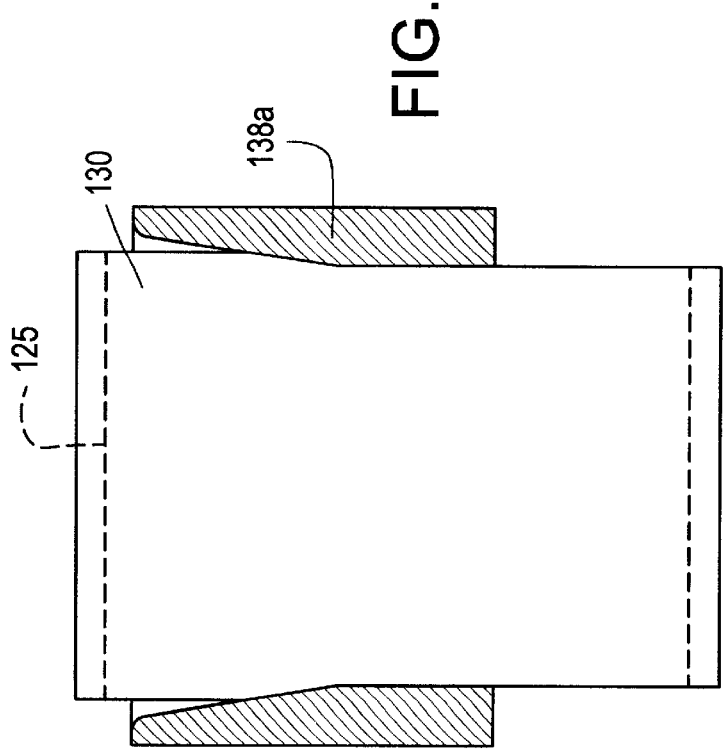
FIG. 3L is a cross section illustrating a swaging operation of the assembled core body and jacket tube after assembly.

From the illustration in FIG. 3K, it will be understood that the exterior periphery of the core body 125 is swaged upon insertion into the jacket tube 130 and thereafter retained in compressive contact with the interior surface 132 of the jacket tube. Alternatively, the core body 125 may be inserted into the jacket tube 130 without compression on insertion as depicted in FIG. 3F. The periphery of the jacket tube 130 is then reduced by swaging the exterior of the jacket tube using a die 138a as shown in FIG. 3L. After reducing the peripheral diameter of the jacket tube 130 in this manner, the core body is placed under compressive contact with the jacket tube 130.

Figure 3M:
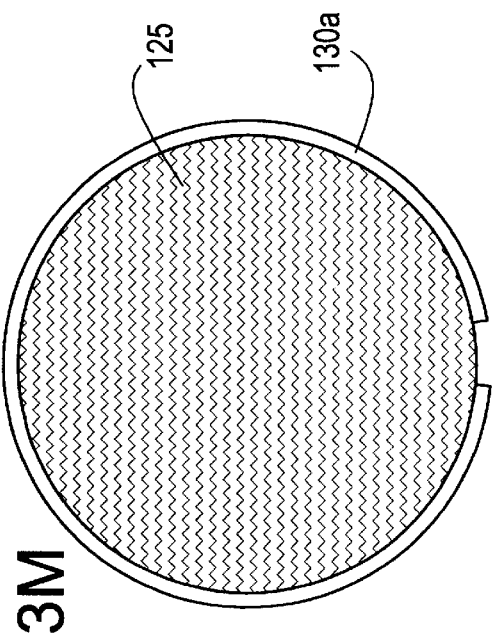
FIG. 3M is a plan view illustrating an alternative manner of assembling the core body and jacket tube.
Figure 3N:
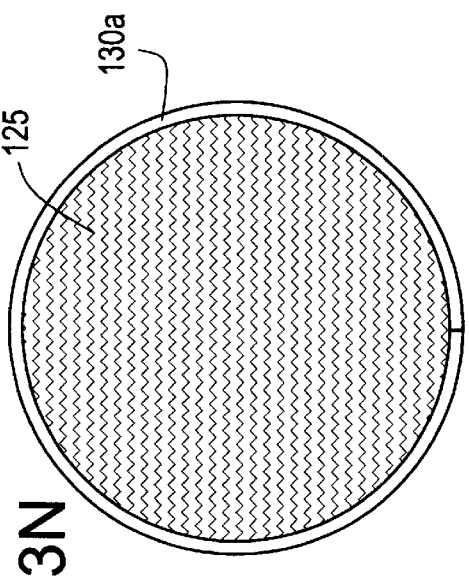
FIG. 3N is a plan view illustrating the core body and jacket tube of FIG. 3M after assembly is completed.

A still further alternative to attainment of a compressive loading of the core body periphery 126 against the interior of the jacket tube 130 is to insert the core body 125 into the jacket tube while it is expanded and before it is closed by welding or brazing. This embodiment is illustrated in FIGS. 3M and 3N of the drawings. After insertion of the core body 125 with the jacket tube 130a opened as shown in FIG. 3M, the open jacket tube is then compressed radially against the core body 125 to be closed along its length. The previously open slit is then joined by brazing or welding to secure the compressed core body 125.

The compressive loading of the core body periphery and the inner surface of the jacket tube against each other after the core body is inserted into the jacket tube, as described with reference to FIGS. 3L, 3M and 3N, offers a facility for mechanically joining the periphery 126 of the core body 125 to the interior of the jacket tube 130. For example, the inside surface 132 of the jacket tube 130 may be roughened by various forms and shapes of surface irregularities, such as peripheral striations, threads, barbs, relieved coating materials, and the like, so that when the jacket tube is compressed against the inserted core, a mechanical retention of the core body 125 within the jacket tube 130 is effected. Such a mechanical retention may be combined with a bond typified by brazing and, in some instances, may be used as a substitute for brazing. Thus, the term "join" is used herein to characterize the connection of the core body periphery to the jacket tube and is intended to encompass mechanical and bonding connections, as well as a combination of both.

To braze the folds 128 at the periphery of the core body to the inside surface 132 of the jacket tube 130 the compressed assembly of the core body and jacket tube preferably is put in a chamber. Air is evacuated and the chamber is backfilled with a non-oxidizing gas, preferably an inert gas such as argon. Also, a vacuum can be used without a gas backfill, as long as the remaining atmosphere is non-oxidizing. Also in the chamber is an induction coil which extends around the jacket tube with about an eighth to a quarter inch clearance between the coil and the jacket tube. When the induction coil is energized, it heats the jacket tube and the outer folds of the foil by induction with a very localized heating effect, melting the brazing metal between the periphery of the core body and the jacket tube. The outside folds of the core body do not have the coating on them so they braze nicely to the interior surface of the jacket tube.

The aforementioned method provides a honeycomb carrier body having a metal jacket, a core body having a length between opposite ends and a periphery defined by folds in a corrugated strip, the interior surface of the jacket engaging the periphery of the core body to be in contact with all folds at the periphery, and a bond between the periphery of the core body and the interior surface of the jacket.

Figure 3T:
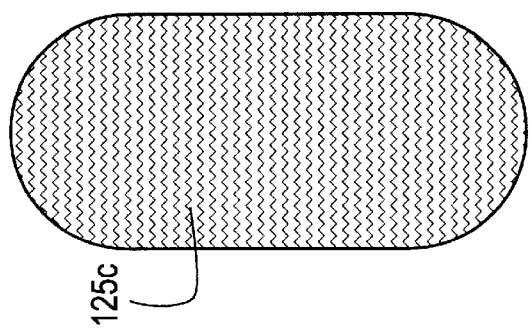
FIGS. 3R, 3S, 3T and 3U are plan views showing alternative configurations of core bodies that may be formed by and used in the present invention.
Figure 3U:
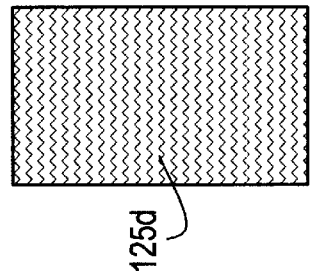
Figure 3R:
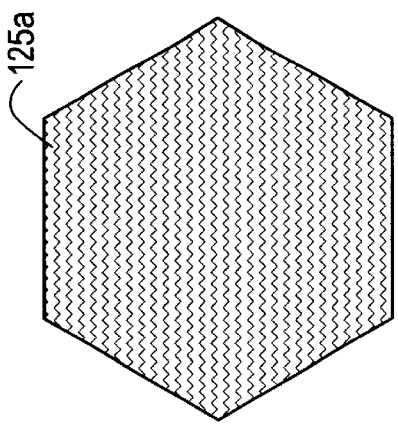
Figure 3S:
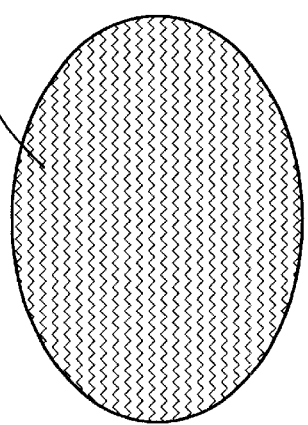
Figure 3P:
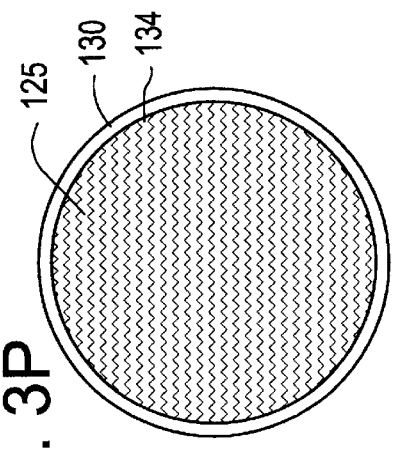
FIG. 3P is a plan view illustrating the honeycomb carrier body product of the invention.
Figure 3Q:
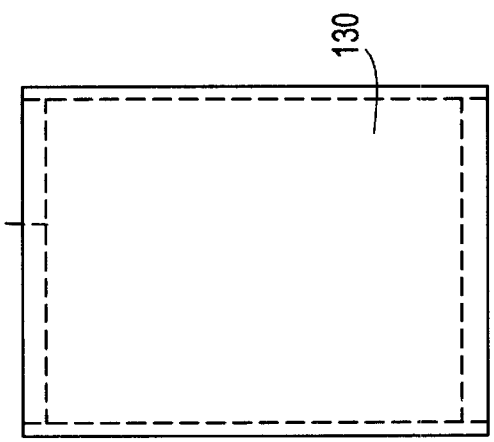
FIG. 3Q is a side elevation of the carrier body illustrated in FIG. 3P.

In an embodiment illustrated in FIGS. 3P and 3Q, a core body 125 of circular cross section is secured under compression within a jacket tube 130 and also by a bond 134, preferably of brazing material, between the outer periphery of the core body 125 and the interior of the jacket tube 130. As shown in FIG. 3Q, the jacket tube is of a length slightly larger than that of the core body 125 so that the ends of the core body are recessed into the ends of the jacket tube 130.

Because of the facility offered by the method of forming the core by selected fold spacing intervals along a continuous corrugated strip, configurations other than the circular cylindrical configuration shown in FIGS. 3P and 3Q can be attained. Thus, in FIG. 3R, a polygonal, more particularly, a hexagonal, end configuration of a core body 125a is illustrated. In FIG. 3S, an elliptical end profile of core body 125b is shown in which the layers of corrugated foil extend across the minor axis of the ellipse. A variation of the elliptical end profile shown in FIG. 3S is illustrated in FIG. 3T. Thus, in FIG. 3T, the end profile of the core body 125c is oblong or "racetrack" shaped. Finally, in FIG. 3U, a core body 125d is illustrated as having a rectangular end profile. In each of the embodiments illustrated in FIGS. 3P–3U, the exterior configuration of the honeycomb carrier body is an erect parallelepiped, that is, the peripheral surfaces of the core body are generated by straight lines parallel with each other and also parallel with the central axis of the core body.

An anchor layer deposited on a substrate as taught herein can provide some rigidity to an excessively ductile or malleable metal substrate, it can provide a roughened surface on which a catalytic material may be deposited, and it can seal the surface of a metal substrate and thus protect the substrate against surface oxidation during use. As mentioned above, the ability to tenaciously adhere a catalytic material to a metal substrate as provided herein may also permit structural modification of a catalyst member as required to conform to the physical constraints imposed by canisters or other features of the exhaust gas treatment apparatus in which the catalyst member is mounted, without significant loss of catalytic material therefrom.

As mentioned above, various deposition methods for depositing catalytic species onto a carrier substrate are known in the art. These include, for example, disposing the catalytic material in a liquid vehicle to form a slurry and wetting the carrier substrate with the slurry by dipping the carrier into the slurry (as mentioned elsewhere herein, e.g., with reference to FIG. 3D), spraying the slurry onto the carrier, etc. Alternatively, the catalytic species may be dissolved in a solvent and the solvent may then be wetted onto the surface of the carrier substrate and thereafter removed to leave the catalytic species, or a precursor thereof, on the carrier substrate. Optionally, the carrier substrate may comprise a support material either as a pre-coat layer thereon or because the carrier is formed from support material. The procedure for removing the liquid or solvent may entail heating the wetted carrier subject to the temperature limitations set forth above. Each such method of applying the catalytic species onto the carrier constitutes a separate step in the manufacturing process relative to the thermal spray application of the anchor layer, and their use therefore provides a distinction to the teaching of U.S. Pat. No. 5,204,302 (discussed above) in which the same plasma spray process for applying an undercoat is used to apply the catalyst. This invention can therefore optionally be described as electric arc spraying an anchor layer on a substrate, discontinuing the spraying of that substrate and then depositing a catalytic material thereon. Other methods for depositing catalytic species onto a carrier member are known and may be used as well, including chemical vapor deposition.

The wire arc spraying technique of the present invention can be used to apply an anchor layer to the smooth interior surfaces of the gas-flow passages formed in a honeycomb-type ceramic carrier, as well as on the front face thereof, to provide a superior surface on which to deposit catalytic material and to increase the turbulence of the gas flowing through the catalyst member and thus increase the catalytic activity. In addition, the anchor layer may be deposited on the smooth exterior surface of the substrate to facilitate mounting the substrate in a canister, as described herein. Other flow-through-type carriers are known as well, e.g., porous foamed metal, wire mesh, etc., in which cases the gas-flow passages may be non-linear, irregular or reticulated. In many such embodiments, the inlet and outlet faces of the carrier are defined simply as the surfaces through which the fluid enters or leaves the carrier, respectively. A flow-through catalyst member is typically mounted in a body such as a canister to guide fluid flow through the carrier.

Figure 4:
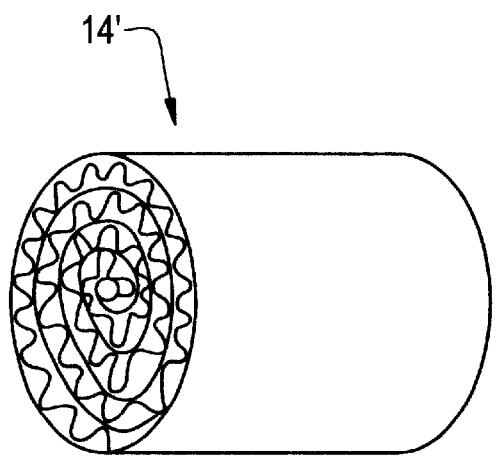
FIG. 4 is a perspective view of a ceramic honeycomb substrate having an anchor layer deposited on the smooth outer surface thereof according to another embodiment of the invention.

As stated above, a catalyst member according to the present invention may be formed from any one or more of the metallic substrates described above, e.g., corrugated, rolled sheet metal, metal foil, wire mesh, foamed metal, etc. In one particular embodiment illustrated in FIG. 4, catalyst member 14' comprises a catalytic material deposited on a rolled foamed metal substrate that has the optional nickel-aluminide anchor layer applied thereto as described above. Catalyst member 14' is mounted in a canister 15 (FIG. 5) to provide a catalytic device. Canister 15 guides exhaust gas first into an inlet face 14a' of catalyst member 14', then through the catalyst member 14' and into contact with the catalytic material thereon, and out the outlet face 14b' and then out the outlet 15b of the canister, as indicated by the arrows.

As mentioned above, this invention is not limited to the use of powdered, i.e., particulate, support materials or powdered or particulate catalytic materials. The platinum and iron catalytic species may be dispersed onto various forms of support materials other than particulate support materials, including, for example, pelletized material as described above for the SELECTOXO™ catalyst, or directly onto a flow-through carrier monolith, e.g., a monolith formed from alumina or another refractory material mentioned above. Accordingly, a catalytic material prepared in accordance with the method of the present invention can be prepared by dispersing the platinum and iron catalytic species onto, e.g., pelletized support material such as pelletized alumina (i.e., alumina tablets). The wetted tablets may be comparable in platinum and iron loading to the prior art SELECTOXO™ catalyst described above, except that they are dried and calcined according to the method aspect of this invention. Alternatively, the catalytic species may be dispersed onto a monolith to produce a catalyst member by various methods, e.g., by spraying a solution of compounds of the catalytic species onto the monolith or by immersing the monolith into the solution. (These techniques can also be used to disperse the catalytic species onto particulate support materials.) The wetted monolith is then calcined in accordance with the present invention.

Figure 3V:
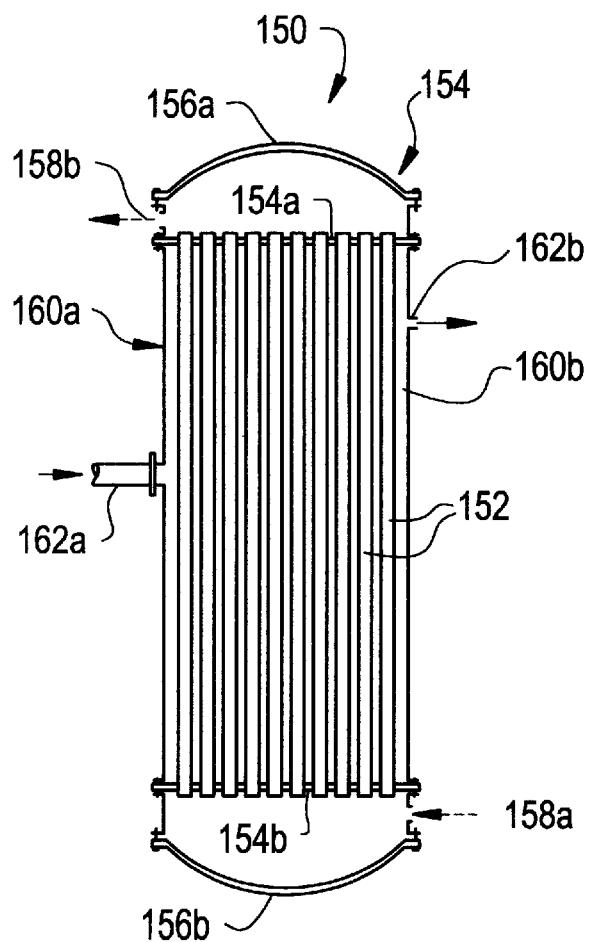
FIG. 3V is a schematic view of a catalyst member configured as a heat exchanger in accordance with another embodiment of the present invention.

Catalytic material may also be coated onto tubular carrier monoliths, e.g., onto aluminum or other metal tubing. One or more such catalyst members can be assembled to form a heat exchanger that is able to simultaneously oxidize carbon monoxide from the gas stream and to exchange heat from the gas stream with another gas stream. The tubes may have a cylindrical configuration, but not necessarily so; other configurations for the tubes will work as well, as is understood in the art. One embodiment of such a device is shown schematically in FIG. 3V. Catalyst member 150 comprises a plurality of tubular catalyst members 152 mounted in a housing 154. The tubular catalyst members comprise calcined aluminum tubes coated with catalytic material as described above. Tubes 152 extend between and through panels 154a and 154b of housing 154. Housing 154 further comprises plenums 156a and 156b that cooperate with panels 154a and 154b to define a gas flow path through the interior of tubes 152. First inlet 158a and first outlet 158b therefore facilitate gas flow through a first flow path in member 150. Housing 154 also comprises panels such as panels 160a and 160b that cooperate with panels 154a to enclose a space about the exterior of tubes 152. The enclosed space is not open to the interior of tubes 152. Second inlet 162a and second outlet 162b in housing 154 therefore permit gas flow through a second flow path through member 150. The tubes are made of metal or another heat-conductive material so that gas flowing through one flow path will exchange heat with gas in the second flow path, as is well-understood in the art.

In alternative embodiments, a catalyst member comprising a metal foam monolith can be mounted in one flow path of a heat exchanger or it may be joined to a heat sink. Heat exchange and heat sink embodiments are particularly useful in view of the temperature sensitivity of the catalytic activity as discussed below in Example 4 because they provide a means of influencing the thermal conditions under which the exothermic CO oxidation reaction is catalyzed.

EXAMPLE 1

Six steel wire mesh substrates and a 100 cpsi metal honeycomb were each wire arc-sprayed using nickel aluminide wire as the anchor layer feedstock. The nickel aluminide wire had a diameter of 1/16 inch (1.59 millimeters (mm)). The molten nickel aluminide alloy was sprayed at 11 lbs/hr with a gas pressure of 70 psi to deposit an anchor layer on the substrates at a stand-off of 6 inches. The spraying process on the 100 cpsi monolith successfully deposited an anchor coat in the interior gas-flow passages of the monolith.

One of the wire mesh substrates was subjected to temperature cycles in air at from about 100° C. to 1000° C. for 15 hours. After the temperature cycling, the mesh was examined and compared to a reference, and no difference between the surfaces of the two samples was noticed. A second wire mesh substrate was cycled for three hours from room temperature to about 930° C. by heating in the flame of a Bunsen burner for about 6 seconds per cycle. Again, upon comparison to a reference, no difference in the surface of the anchor layers was seen. Catalytic material was applied to each of the samples and excellent adhesion was seen in all cases.

EXAMPLE 2

A particulate catalytic material was prepared by dispersing platinum and iron catalytic components onto a particulate support material comprising alumina in a wet impregnation process generally as described above, in which the platinum was dissolved in a solution in the form of bivalent cations. Platinum was dispersed on the support material at a loading of 5 weight percent. The iron was dispersed on the support material at a loading of 0.3 weight percent. After the support material was impregnated with the solution containing the platinum and iron, the wetted support material was dried and then calcined at a temperature that was within but that did not exceed the range of between 200° C. and 300° C. A slurry comprising equal weights of catalytic material and deionized water was prepared and was ball milled for 5 hours to achieve an average particle size in the slurry of about 9.2 micrometers.

Cordierite honeycomb carrier members were prepared by washing with a mixture of equal quantities of acetic acid and deionized water, and were then dried at 150° C. and coated with catalytic material. The coated carrier members were dried at 150° C. to produce finished catalyst members.

The catalytic material was observed to adhere more securely to the foamed metal substrates with the nickel-aluminide anchor layer than to the cordierite honeycomb carrier members.

Several other catalyst members were prepared using a metallic parallel channel carrier monolith onto which an etch coat or bottom coat of alumina was applied at a target loading of 0.5 g/in³ before applying the top coat comprising the platinum and iron catalytic material. In each case, the etch coat was dried and calcined onto the carrier substrate at 500° C. but the catalytic material was calcined at 200° C. The top coat was applied at loadings in the range of 1.67 to 1.82 g/in³.

Metallic foam substrates characterized variously as having 20 or 40 pores per linear inch (ppi), each with a nickel-aluminide anchor layer thereon were coated with two layers of the platinum- and iron-containing catalytic material described above for a total dry weight gain ranging from 1.1 g/in³ to 2.22 g/in³. The 20 and 40 ppi catalyst members were subjected to testing in a laboratory reactor that provided a simulated feed gas from a gasoline autothermal reformer. The reactor provided three catalytic zones separated by glass beads for temperature control. The conditions simulated the second reactor (polishing) of a two-reactor system in which the inlet to the catalyst comprised 390 parts per million carbon monoxide. The catalyst members were found to be effective for the conversion of carbon monoxide to carbon dioxide in the presence of excess oxygen. After a few hours of testing the catalytic members became deactivated as a result of flooding of the reactor beds. Some spalling of the catalytic material from the first catalyst member was observed.

EXAMPLE 3

A particulate alumina support material was impregnated with a platinum- and iron-containing solution in which the platinum was in the form of a bivalent cation, as described above. The platinum was dispersed onto the alumina at a loading of 5 eight percent (dry basis) and the iron was dispersed on the alumina at a loading of 0.3 weight percent. The impregnated material was ground to a particle size of 40 to 60 micrometers and was rendered in a slurry with similarly sized quartz particles at a catalyst:quartz ratio of 1:2. The influence of calcination temperature in air, an oxygen-containing atmosphere, and under a nitrogen blanket, i.e., an inert atmosphere, was performed by calcining samples of the wetted alumina material for two hours at temperatures ranging from 200° C. to 500° C. The resulting catalytic materials were then tested to evaluate their relative performance for the selective conversion of carbon monoxide in a gas stream containing hydrogen and oxygen. The catalytic materials were tested in quantities of 1.6 grams and a density of 0.72 g/cm³. The test gas feed stream was flowed through each material sample at 90° C. at a volume hourly space velocity of 120,000 per hour, for a total flow rate of 4 liters per minute. The test gas contained an initial carbon monoxide concentration of 1,000 ppm, 20% $H_2$, 10% $H_2O$ and sufficient oxygen to provide a molecular $O_2$:CO ratio of 0.5:1 (i.e., stoichiometric quantities). Carbon monoxide conversion was determined from measurements of the amount of CO consumed and of $CO_2$ generated and was determined by an average of the data from those measurements. The measured error of the carbon dioxide analyzer was 3 to 8 percent and the measured error of the carbon monoxide analyzer was 1 to 3 percent. The measurement error for the oxygen analyzer was 1 to 3 percent. Selectivity data regarding oxygen consumption for conversion of carbon monoxide relative to oxidation of hydrogen was calculated by using data from analyzers measuring oxygen and carbon dioxide levels.

The results of the various measurements are depicted in FIG. 6. These results show that catalytic material prepared in a method in which the calcination temperature is between 200° C. and 300° C. in an oxidizing atmosphere provides superior overall performance for the oxidation of carbon monoxide and superior selectivity for the conversion of carbon monoxide relative to the conversion of hydrogen. In particular, calcination in air between 200° C. and 300° C. will yield a carbon monoxide conversion rate of about 76 percent, which is higher than rates obtained by materials calcined in air at temperatures below 200° C. and above 300° C., and higher than those calcined at the same temperatures in an inert atmosphere. Furthermore, the data show that catalytic material calcined in air between 200° C. and 300° C. will generate a minimum of unwanted oxidation of hydrogen, at a level of about 22 percent. Materials calcined in an inert atmosphere are less selective than materials calcined in air, i.e., they cause a significantly greater rate of unwanted oxidation of hydrogen relative to the conversion rate for carbon monoxide. The data thus show that unexpectedly superior performance can be obtained from selective oxidation catalytic materials calcined between 200° C. and 300° C. in air.

EXAMPLE 4

A catalyst member was prepared in accordance with the present invention by applying onto a cordierite honeycomb monolith a catalytic material comprising 5 percent platinum and 0.3 percent iron dispersed on alumina. The honeycomb monolith was configured to have 400 cpsi and carried a catalytic washcoat loading of 1.44 g/in³. The resulting catalyst member was tested under a variety of test conditions with a test gas containing 1,000 ppm CO, 20 percent $H_2$ and 10 percent $H_2O$.

Tests were run at various temperatures, volume hourly space velocities and oxygen content. A summary of the pertinent test gas compositions and testing conditions is set forth in the following TABLE.

TABLE I

| Test | Temp. | $O_2$:CO | Test Gas Volume Hourly Space Velocity (VHSV) | Figure in which Results are Shown |
|---|---|---|---|---|
| I | 90° C. | 0.5:1 | (varied) | FIG. 7 |
| II | (varied) | 0.5:1 | 80,000/hr | FIG. 8 |
| III | 90° C. | (varied) | 20,000/hr | FIG. 9 |
| IV | 90° C. | (varied) | 80,000/hr | FIG. 10 |
| V | 150° C. | (varied) | 80,000/hr | FIG. 11 |

The oxygen consumption rate and rate of carbon monoxide conversion were measured in each test and the results are set forth in the accompanying figures. FIG. 7 shows that CO oxidation decreases with increasing volume hourly space velocity while FIG. 8 shows the CO oxidation increases with rising temperature. FIGS. 9, 10 and 11 show that CO oxidation increases as the $O_2$:CO mole ratio increases. FIG. 9 shows that adequate carbon monoxide conversion was attained at low temperature (e.g., 90° C.), low space velocity (e.g., 20,000/hr), and at a greater than stoichiometric $O_2$:CO ratio, i.e., around 0.8:1. FIG. 11 shows that similar results were attained at 150° C., 80,000/hr VHSV and a $O_2$:CO ratio of at least 1:1.

While the invention has been described in detail with reference to particular embodiments thereof, it will be apparent that upon a reading and understanding of the foregoing, numerous alterations to the described embodiments will occur to those of ordinary skill in the art and it is intended to include such alterations within the scope of the appended claims.

What is claimed is:

1. A catalyst member comprising a carrier substrate having a catalytic material thereon, wherein the catalytic material is prepared by the method comprising wetting powdered refractory inorganic oxide comprised of alumina with a bivalent platinum solution and an iron solution, and drying and calcining the wetted support material under oxidizing conditions at a temperature in the range of from 200° C. up to, but not including, 300° C., wherein the platinum is present at a loading in the range of from about 3 to 5 percent and the iron is present at a loading of about 0.3 percent, both calculated as percent by weight of the catalytic material.

2. The method of claim 1 carried out at a temperature in the range between 200° C. and 285° C.

3. The method of claim 1 carried out at a temperature in the range between 215° C. and 285° C.

4. A catalyst member comprising a carrier substrate having a catalytic material thereon, wherein the catalytic material is prepared by the method comprising wetting a refractory inorganic oxide support material with a bivalent platinum solution and an iron solution, and treating the resulting wetted support material by a process consisting essentially of drying and calcining the wetted support material under oxidizing conditions and at a temperature in the range of from 200° C. up to, but not including, 300° C., wherein the catalytic material is substantially free of at least one metal selected from the group consisting of palladium, rhodium and cerium, and wherein the carrier substrate comprises a metal substrate having a surface layer of metal oxide.

5. The catalyst member of claim 4 comprising a coating of refractory inorganic oxide material on the carrier as a binder coat beneath the catalytic material.

6. The catalyst member of claim 4 wherein the metal substrate comprises a foamed metal substrate.

7. The catalyst member of claim 4 wherein the metal substrate is calcined before the catalytic material is deposited thereon to produce the surface layer of metal oxide.

8. The catalyst member of claim 7 wherein the metal substrate comprises a foamed metal substrate.

9. The catalyst member of claim 4 wherein the support material comprises a powdered support material.

10. The catalyst member of claim 9 wherein the support material comprises alumina.

\* \* \* \* \*